(12) United States Patent
Liang et al.

(10) Patent No.: US 9,593,215 B2
(45) Date of Patent: Mar. 14, 2017

(54) POLYMER USEFUL FOR AN ION EXCHANGE MEMBRANE

(71) Applicant: The Regents of the University of California, Oakland, CA (US)

(72) Inventors: Siwei Liang, Albany, CA (US); Nathaniel A. Lynd, Austin, TX (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 14/757,920

(22) Filed: Dec. 23, 2015

(65) Prior Publication Data

US 2016/0222177 A1 Aug. 4, 2016

Related U.S. Application Data

(60) Provisional application No. 62/096,418, filed on Dec. 23, 2014.

(51) Int. Cl.

| | |
|---|---|
| C08J 5/22 | (2006.01) |
| B01J 41/12 | (2006.01) |
| C08G 65/48 | (2006.01) |
| C25B 13/08 | (2006.01) |
| C25B 1/00 | (2006.01) |
| C25B 1/10 | (2006.01) |

(52) U.S. Cl.
CPC ............ *C08J 5/2256* (2013.01); *B01J 41/125* (2013.01); *C08G 65/485* (2013.01); *C25B 1/003* (2013.01); *C25B 1/10* (2013.01); *C25B 13/08* (2013.01); *C08J 2371/12* (2013.01)

(58) Field of Classification Search
CPC .... C08J 5/2256; C08J 2371/12; B01J 41/125; C08G 65/485; C25B 13/08; C25B 1/003; C25B 1/10
USPC .......................................................... 521/27
See application file for complete search history.

(56) References Cited

FOREIGN PATENT DOCUMENTS

CN 104151590 A * 11/2014

OTHER PUBLICATIONS

Bouzek et al. "H+ and Na+ Ion Transport Properties of Sulfonated Poly(2,6-dimethyl-1,4-phenyleneoxide) Membranes", Journal of The Electrochemical Society, (2003), 150 (6) E329-E336 (2003).*
Han et al. "Preparation and characterization of novel poly (2,6-dimethyl-1,4-phenylene oxide) anion-exchange membranes for alkaline fuel cells", J. Gaodeng Xuexiao Huaxue Xuebao (2013), 34(10), 2437-2444.*
Berger et. al., "Material requirements for membrane separators in a water-splitting photoelectrochemical cell", Energey and Environmental Science, vol. 7, pp. 1468-1476, (2014).
Guler et. al., "Tailor-Made Anion-Exchange Membranes for Salinity Gradient Power Generation Using Reverse Electrodialysis", ChemSusChem, vol. 5, pp. 2262-2270, (2012).
Hickner et. al., "Anion Exchange Membranes: Current Status and Moving Forward", Journal of Polymer Science, Part B, Polymer Physics, vol. 51, pp. 1727-1735, (2013).
Li et. al., "A novel poly(2,6-dimethyl-1,4-phenylene oxide) with trifunctional ammonium moieties for alkaline anion exchange membranes", Chem. Commun., vol. 50, pp. 2791-2793, (2014).
Lin et. al., "Alkaline polymer electrolytes containing pendant dimethylimidazolium groups for alkaline membrane fuel cells", Journal of Materials Chemistry A, vol. 1, pp. 7262-7269, (2013).
Lin et. al., "Alkaline Stable C2-Substituted Imidazolium-Based Anion-Exchange Membranes", Chemistry of Materials, vol. 25, pp. 1858-1867, (2013).
Lin et. al., "Alkaline stable C2-substituted imidazolium-based cross-linked anion exchange membranes for alkaline fuel cell applications", Journal of Power Sources, vol. 266, pp. 186-192, (2014).
Liska et. al., "A route to preparation of bromomethylated poly (2,6-dimet hyl-I,4-p henylene oxide)", Die Angewandte Makromolekulare Chemie, vol. 211, No. 3673, pp. 121-129, (1993).
Liu et. al., "Anion Transport in a Chemically Stable, Sterically Bulky α-C Modified Imidazolium Functionalized Anion Exchange Membrane", Journal of Physical Chemistry, C, vol. 118, pp. 15136-15145, (2014).
McCrory et. al., "Benchmarking Heterogeneous Electrocatalysts for the Oxygen Evolution Reaction", Journal of the American Chemical Society, vol. 135, pp. 16977-16987, (2013).
Ran et. al., "Anion exchange membranes (AEMs) based on poly(2,6-dimethyl-1,4-phenylene oxide) (PPO) and its derivatives", Polymer Chemistry, vol. 6, pp. 5809-5826, (2015).
Rao et. al., "Crosslinked poly(arylene ether sulfone) block copolymers containing pendant imidazolium groups as both crosslinkage sites and hydroxide conductors for highly selective and stable membranes", International Journal of Hydrogen Energy, vol. 39, pp. 5919-5930, (2014).
Reddy et. al., "Batteries based on fluoride shuttle", Journal of Materials Chemistry, vol. 21, pp. 17059-17062, (2011).
Schneider et. al., "Ionic Conduction in Nanostructured Membranes Based on Polymerized Protic Ionic Liquids", Macromolecules, vol. 46, pp. 1543-1548, (2013).
Xu, et. al., "Fundamental studies of a new series of anion exchange membranes: membrane preparation and characterization", Journal of Membrane Science, vol. 190, pp. 159-166, (2001).
Xu, et. al., "Effect of cell configurations on the performance of citric acid production by a bipolar membrane electrodialysis", Journal of Membrane Science, vol. 203, pp. 145-153, (2002).
Zhang et. al., "A novel guanidinium grafted poly(aryl ether sulfone) for high-performance hydroxide exchange membranes", Chemistry Communication, vol. 46, pp. 7495-7497, (2010).

* cited by examiner

*Primary Examiner* — Michael M Bernshteyn
(74) *Attorney, Agent, or Firm* — Robin C. Chiang; Lawrence Berkeley National Laboratory

(57) ABSTRACT

The present invention provides for a polymer formed by reacting a first reactant polymer, or a mixture of first reactant polymers comprising different chemical structures, comprising a substituent comprising two or more nitrogen atoms (or a functional group/sidechain comprising a two or more nitrogen atoms) with a second reactant polymer, or a mixture of second reactant polymers comprising different chemical structures, comprising a halogen substituent (or a functional group/sidechain comprising a halogen).

18 Claims, 14 Drawing Sheets

POLYMER USEFUL FOR AN ION EXCHANGE MEMBRANE

RELATED PATENT APPLICATIONS

The application claims priority to U.S. Provisional Patent Application Ser. No. 62/096,418, filed Dec. 23, 2014; which is incorporated herein by reference.

STATEMENT OF GOVERNMENTAL SUPPORT

The invention was made with government support under Contract No. DE-AC02-05CH11241 awarded by the U.S. Department of Energy. The government has certain rights in the invention.

FIELD OF THE INVENTION

The present invention is in the field of polymers useful for anion exchange membranes.

BACKGROUND OF THE INVENTION

Nafion (FIG. 1) is a benchmark ionic membrane has been used in fuel cells. However Nafion has undesirable high permeability to many substances used in fuel cells.

SUMMARY OF THE INVENTION

The present invention provides for a polymer formed by reacting a first reactant polymer, or a mixture of first reactant polymers comprising different chemical structures, comprising a substituent comprising two or more nitrogen atoms (or a functional group/sidechain comprising a two or more nitrogen atoms) with a second reactant polymer, or a mixture of second reactant polymers comprising different chemical structures, comprising a halogen substituent (or a functional group/sidechain comprising a halogen). In some embodiments, the substituent comprises a heterocycle structure comprising two or more nitrogen atoms. In some embodiments, the substituent comprises an imidazole. In some embodiments, the substituent is 2-methyl imidazole. In some embodiments, the halogen substituent comprises a branched or unbranched alkyl group substituted with a halogen. In some embodiments, the alkyl group is a straight alkyl chain having from one to ten carbon atoms. In some embodiments, the halogen substituent is —(CH$_2$)$_a$-Hal, wherein a is an integer from one to ten, and Hal is a halogen. In some embodiments, a is an integer is one, two, three, or four.

In some embodiments, the first reactant polymer is a polyphenylene oxide, polysulfone, polyimide, polyketone, polyepichlorohydrin, polyether, or the like, comprising a 2-methyl imidazole substituent (or a functional group/sidechain comprising a 2-methyl imidazole). In some embodiments, the second reactant polymer is a polyphenylene oxide, polysulfone, polyimide, polyketone, polyepichlorohydrin, polyether, or the like, comprising a halogen substituent (or a functional group/sidechain comprising a halogen).

In some embodiments, the polymer has the chemical structure:

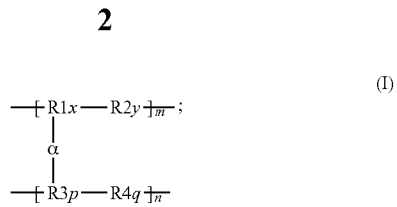

wherein α is a subtituent comprising two or more nitrogen atoms; R1, R2, R3, and R4 are each independently a phenylene oxide, sulfone, imide, ketone, or epichlorohydrin; x and p each is independently an integer having a value ranging from 1 to 1,000; y and q each is independently an integer having a value ranging from 0 to 1,000, or 1 to 1,000; and, m and n each is independently an integer having a value ranging from 1 to 1,000,000. In some embodiments, R1 and R2 are identical. In some embodiments, R3 and R4 are identical. In some embodiments, R1, R2, R3, and R4 are identical. In some embodiments, y and/or q is 0. In some embodiments, a is a subtituent comprising a heterocycle structure comprising two or more nitrogen atoms. In some embodiments, the substituent comprises an imidazole. In some embodiments, a comprises a nitrogen with a positive charge. In some embodiments, the nitrogen with a positive charge is associated with an anion, such as a hydroxide anion.

In some embodiments, the polymer has the chemical structure:

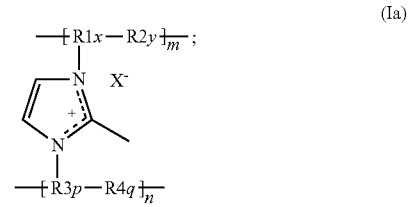

wherein X$^-$ corresponds to any anion. In some embodiments, X$^-$ is a hydroxide anion.

In some embodiments, m and/or n each is independently an integer having a value ranging from 1 to 500,000. In some embodiments, m and/or n each is independently an integer having a value ranging from 1 to 100,000. In some embodiments, m and/or n each is independently an integer having a value ranging from 1 to 50,000. In some embodiments, m and/or n each is independently an integer having a value ranging from 1 to 10,000. In some embodiments, m and/or n each is independently an integer having a value ranging from 1 to 5,000. In some embodiments, m and/or n each is independently an integer having a value ranging from 1 to 1,000. In some embodiments, x, y, p, and/or q each is independently an integer having a value ranging from 1 to 500. In some embodiments, x, y, p, and/or q each is independently an integer having a value ranging from 1 to 100. In some embodiments, x, y, p, and/or q each is independently an integer having a value ranging from 1 to 50. In some embodiments, x, y, p, and/or q each is independently an integer having a value ranging from 1 to 10.

In some embodiments, the first reactant polymer has the chemical structure:

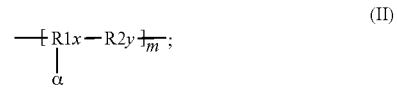

wherein α is a subtituent comprising two or more nitrogen atoms; R1 and R2 are each independently a phenylene oxide, sulfone, imide, ketone, or epichlorohydrin; x is an integer having a value ranging from 1 to 1,000; y is an integer having a value ranging from 0 to 1,000, or 1 to 1,000; and, m is independently an integer having a value ranging from 1 to 1,000,000. In some embodiments, R1 and R2 are identical. In some embodiments, y is 0. In some embodiments, α is a subtituent comprising a heterocycle structure comprising two or more nitrogen atoms.

In some embodiments, the first reactant polymer has the chemical structure:

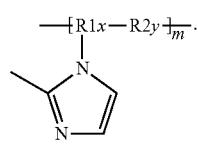

(IIa)

In some embodiments, the second reactant polymer has the chemical structure:

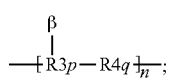

(III)

wherein R3 and R4 are each independently a phenylene oxide, sulfone, imide, ketone, or epichlorohydrin; β is a halogen substiuent; p is an integer having a value ranging from 1 to 1,000; q is an integer having a value ranging from 0 to 1,000, or 1 to 1,000; and, n is independently an integer having a value ranging from 1 to 1,000,000. In some embodiments, R3 and R4 are identical. In some embodiments, q is 0. In some embodiments, (3 is —$(CH_2)_a$-Hal, wherein a is an integer from one to ten, and Hal is a halogen. In some embodiments, a is an integer is one, two, three, or four.

In some embodiments, the polymer is a polyphenyl oxide (PPO) membrane having the chemical structure:

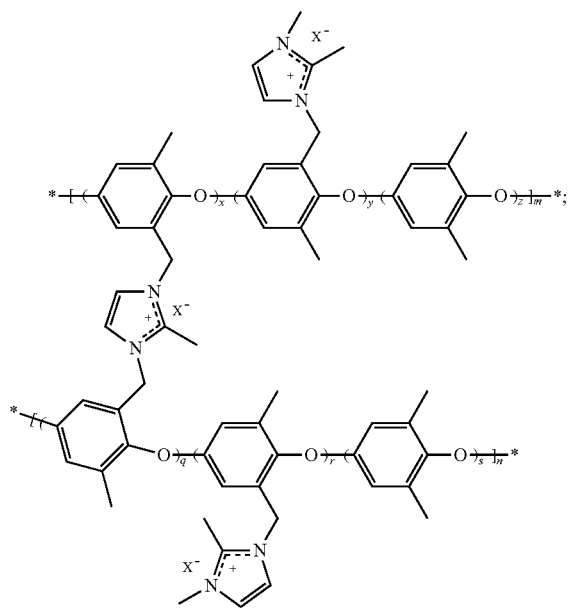

(IV)

wherein q, r, s, x, y, and z each is independently an mole fraction having a value ranging from 0.001 to 0.999; and m and n each is independently an integer having a value ranging from 1 to 1,000,000. In some embodiments, the values of q, r, and s are equal to the values for x, y, and z, respectively. In some embodiments, $X^-$ corresponds to any anion. In some embodiments, $X^-$ is a hydroxide anion.

The present invention also provides for a composition comprising a blend of two or more polymers of different chemical structures, wherein each polymer is a polymer of the present invention.

In some embodiments, the composition comprises a blend of two or more polymers of different chemical structures, wherein each polymer has the chemical structure:

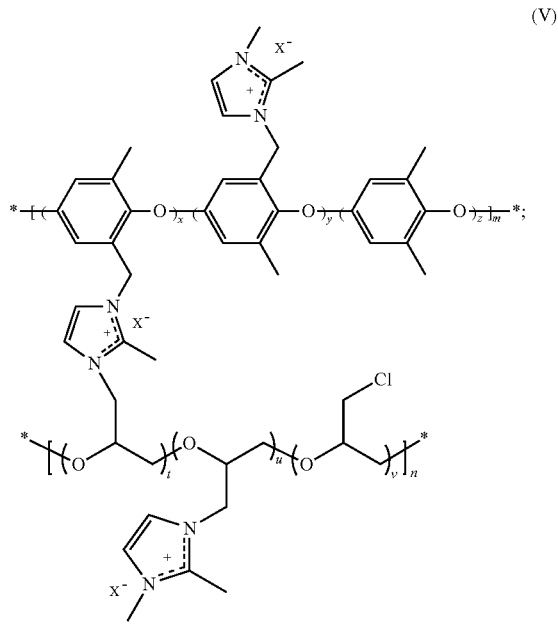

(V)

wherein t, u, v, x, y, and z each is independently an mole fraction having a value ranging from 0.001 to 0.999, and m and n each is independently an integer having a value ranging from 1 to 1,000,000. In some embodiments, the values oft, u, and v are equal to the values for x, y, and z, respectively. In some embodiments, $X^-$ corresponds to any anion. In some embodiments, $X^-$ is a hydroxide anion.

In some embodiments, m and/or n each is independently an integer having a value ranging from 1 to 500,000. In some embodiments, m and/or n each is independently an integer having a value ranging from 1 to 100,000. In some embodiments, m and/or n each is independently an integer having a value ranging from 1 to 50,000. In some embodiments, m and/or n each is independently an integer having a value ranging from 1 to 10,000. In some embodiments, m and/or n each is independently an integer having a value ranging from 1 to 5,000. In some embodiments, m and/or n each is independently an integer having a value ranging from 1 to 1,000. In some embodiments, n, t, u, x and/or y each is independently an integer having a value ranging from 1 to 500. In some embodiments, n, t, u, x and/or y each is independently an integer having a value ranging from 1 to 100. In some embodiments, n, t, u, x and/or y each is independently an integer having a value ranging from 1 to 50. In some embodiments, n, t, u, x and/or y each is independently an integer having a value ranging from 1 to 10.

In some embodiments, the polymer of the present invention comprises the following chemical structure:

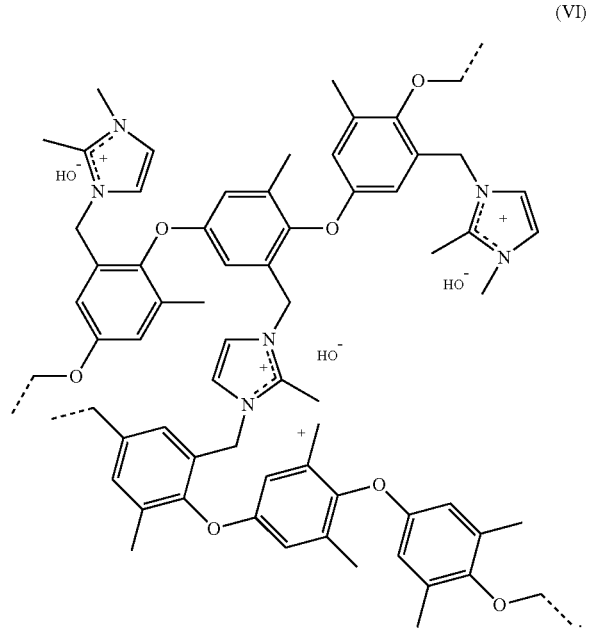

(VI)

The halogen is fluorine (F), chlorine (Cl), bromine (Br), iodine (I), or astatine (At).

The present invention also provides for a composition comprising the first reactant polymer, the second reactant polymer, or a mixture of both. In some embodiments, the composition comprises a plurality of the first reactant polymer comprising different first reactant polymers having different chemical structures; a plurality of the second reactant polymer comprising different second reactant polymers having different chemical structures; or a mixture of both. In some embodiments, the composition comprises the first reactant polymer having the chemical formula (II), the second reactant polymer having the chemical formula (III), or a mixture of both. In some embodiments, the composition comprises a plurality of the first reactant polymer having the chemical formula (II) comprising different first reactant polymers having different chemical structures; a plurality of the second reactant polymer having the chemical formula (III) comprising different second reactant polymers having different chemical structures; or a mixture of both.

The present invention also provides an ion-exchange membrane comprising the polymer of the present invention. The membrane has one or more of the following properties: reasonable conductivity, low permeability to neutral species, and good mechanical properties at wet state.

The present invention also provides for a device comprising the polymer or membrane of the present invention. In some embodiments, the device is a fuel cell or an artificial photosynthesis device.

The present invention provides for a method for synthesizing a membrane of the present invention comprising: reacting the first reactant polymer and the second reactant polymer, optionally (a) converting a precursor polymer into the second reactant polymer, optionally (b) converting the second reactant polymer into the first reactant polymer, wherein steps (a) and (b) occur prior to the reacting step. The precursor polymer is a polyphenylene oxide, polysulfone, polyimide, polyketone, polyepichlorohydrin, polyether, or the like, or a mixture thereof.

In some embodiments, the reacting step comprises mixing a first solution comprising the first reactant polymer and a second solution comprising the second reactant polymer. In some embodiments, the first reactant polymer has the chemical formula (II), and optionally the second reactant polymer has the chemical formula (III). In some embodiments, the second reactant polymer has the chemical formula (III). In some embodiments, the converting step (a) comprises contacting the precursor polymer and NBS to form the second reactant polymer. In some embodiments, the converting step (b) comprises contacting the second reactant polymer and 2-methyl imidazole to form the first reactant polymer.

The present invention provides for a method for synthesizing a chemically and thermally stable anion exchange membranes. The crosslinking reagent comprises a structure comprising two or more nitrogen atoms (such as an imidazole, such as 2-methyl imidazole), which is chemically stable. The polymer backbones covered in this invention include polyphenylene oxide, polysulfone, polyimide, polyketone, polyepichlorohydrin, polyether, and many other polymers which have or can be chemically modified to have halogen-containing groups (such as —$CH_2Cl$, —$CH_2Br$, or —$CH_2I$) as side chains.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION OF THE INVENTION

Figure 1:
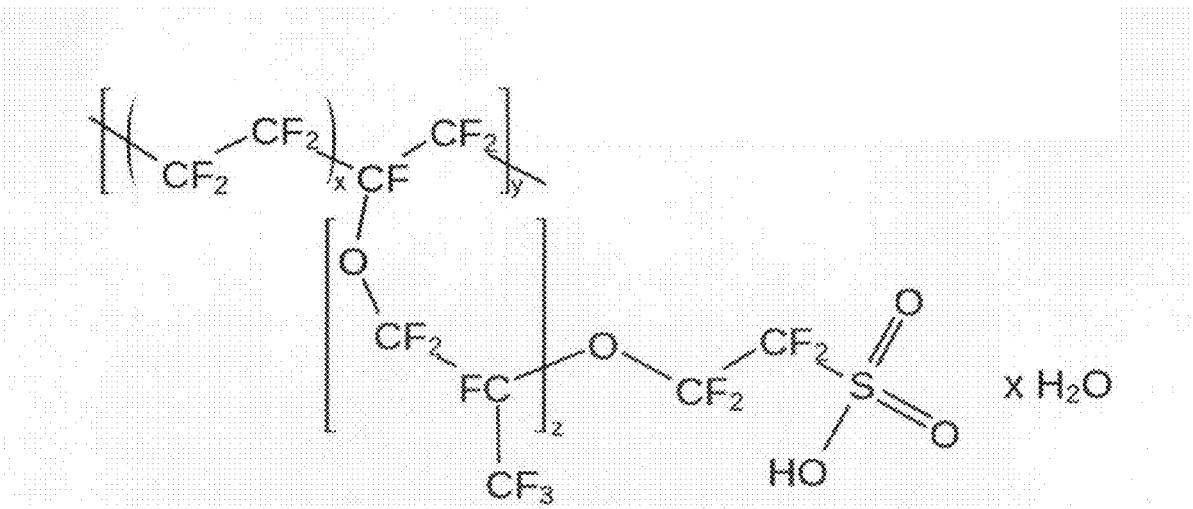
FIG. 1 shows the chemical structure of Nafion or a sulfonated tetrafluoroethylene based fluoropolymer-copolymer.

Before the present invention is described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

The terms "optional" or "optionally" as used herein mean that the subsequently described feature or structure may or may not be present, or that the subsequently described event or circumstance may or may not occur, and that the description includes instances where a particular feature or structure is present and instances where the feature or structure is absent, or instances where the event or circumstance occurs and instances where it does not.

These and other objects, advantages, and features of the invention will become apparent to those persons skilled in the art upon reading the details of the invention as more fully described below.

In some embodiments, the membranes prepared using the polymers of the present invention have one or more of the following characteristics: prevents molecular oxygen diffusion, prevents molecular hydrogen diffusion, when in a device allows hydroxide or proton to move in one direction across the membrane, reasonable conductivity, low fuel crossover, and good mechanical properties at dry and/or wet state.

In some embodiments, the membrane is a chemically and/or thermally stable anion exchange membrane.

Figure 7:
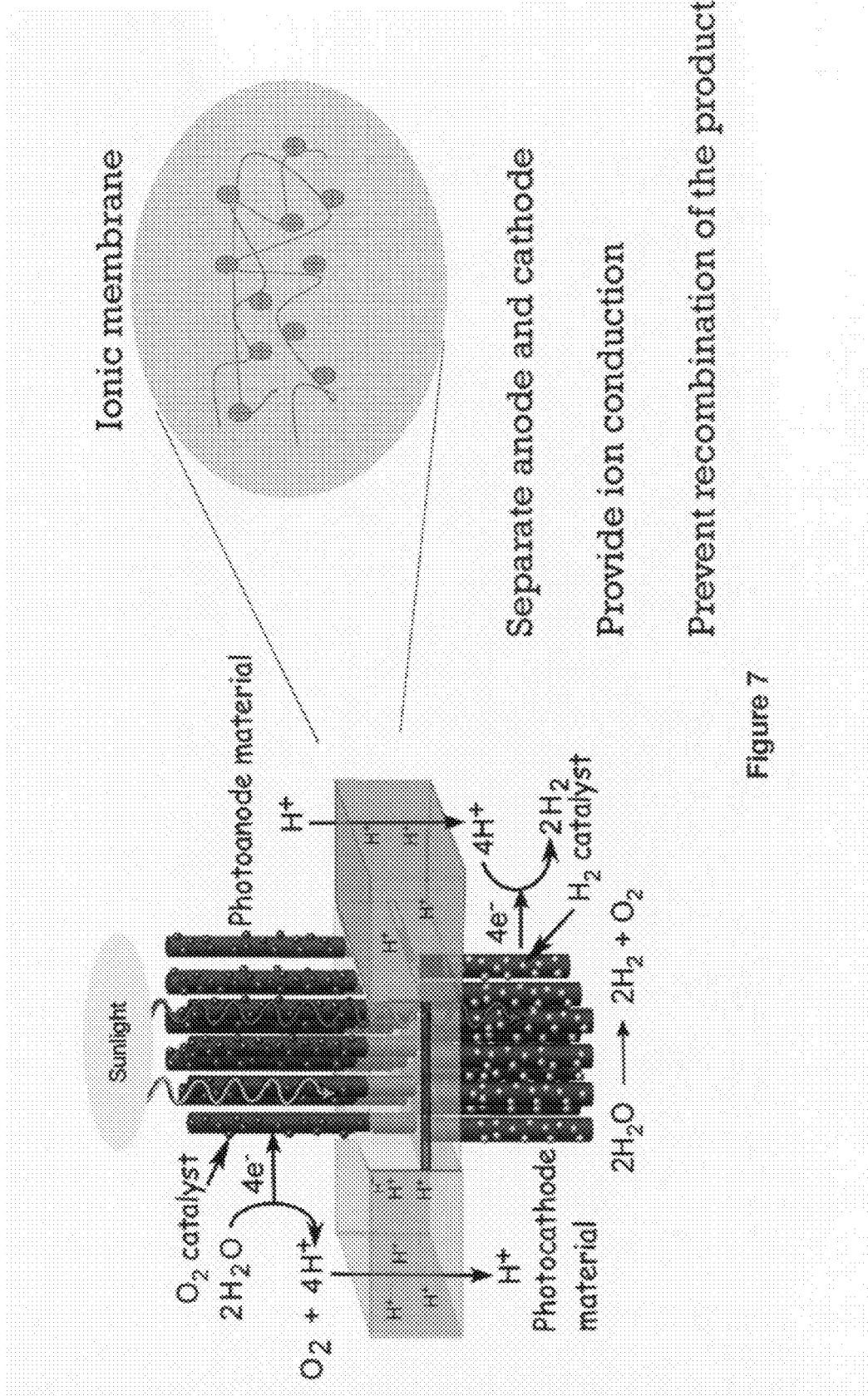
FIG. 7 shows a membrane in an artificial photosynthesis device.
Figure 10:
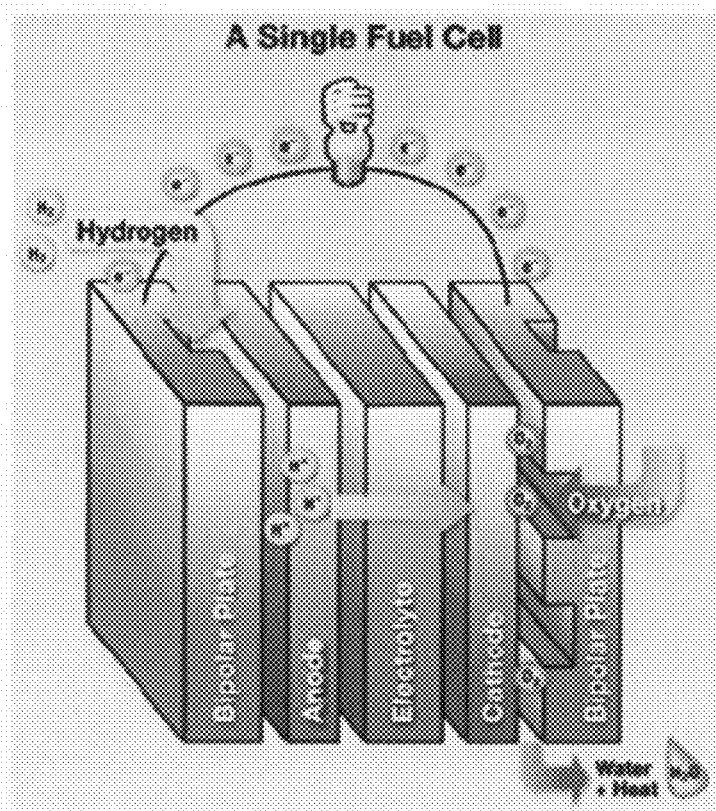
FIG. 10 shows a single fuel cell.

The membranes prepared using the polymers of the present invention are useful in applications in fuel cells, such as methanol fuel cells, artificial photosynthesis devices, and any device that requires a high performance anion exchange membrane. The membrane can be used in devices shown in FIGS. 7 and 10. FIG. 7 shows a membrane in an artificial photosynthesis device. The membrane separates the anode and cathode, provides ion conduction, and prevents recombination of the products.

Methods for synthesizing PPO are disclosed in U.S. Pat. No. 6,441,074.

Methods for synthesizing the polymer of the present invention are described in Example 1 herein.

It is to be understood that, while the invention has been described in conjunction with the preferred specific embodiments thereof, the foregoing description is intended to illustrate and not limit the scope of the invention. Other aspects, advantages, and modifications within the scope of the invention will be apparent to those skilled in the art to which the invention pertains.

All patents, patent applications, and publications mentioned herein are hereby incorporated by reference in their entireties.

The invention having been described, the following examples are offered to illustrate the subject invention by way of illustration, not by way of limitation.

Example 1

Figure 2:
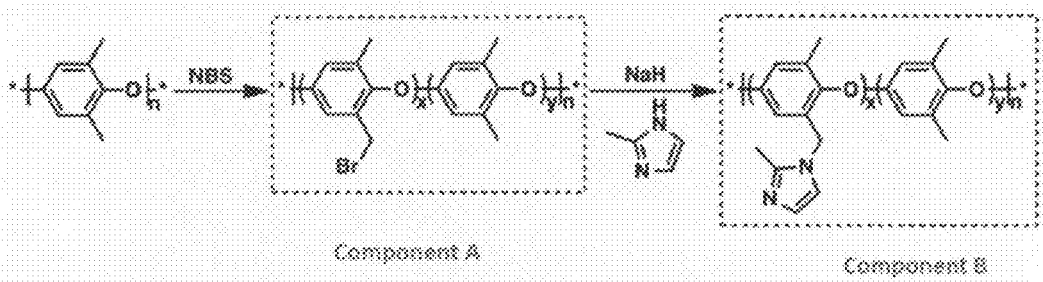
FIG. 2 shows a synthesis of PPO Precursor A and Precursor B.
Figure 3:
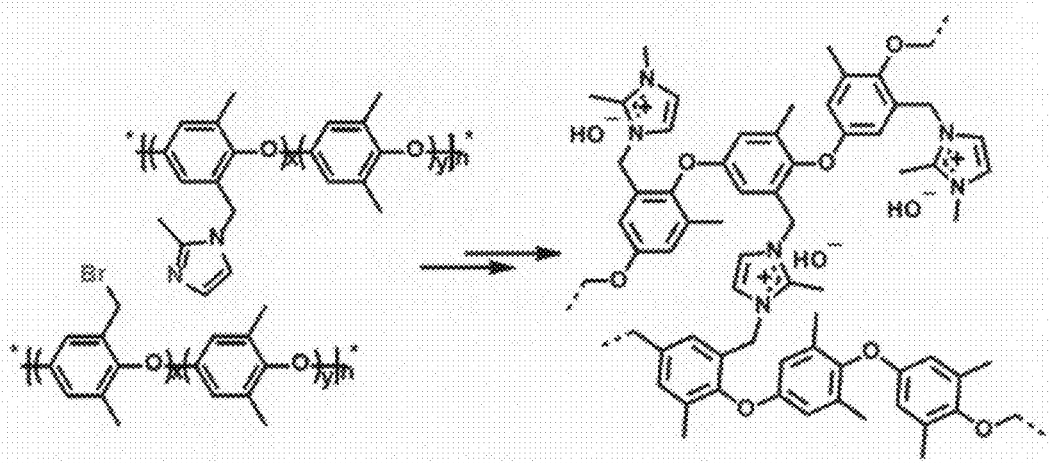
FIG. 3 shows a fabrication of crosslinked PPO membrane by Precursor A and Precursor B.

One example of the membrane, based on polyphenyl oxide (PPO), is shown in FIGS. 2 and 3. FIG. 2 shows the synthesis of PPO Precursor A and Precursor B. PPO is more stable than polysulfone and polyketone due to the electron-withdrawing groups on polysulfone and polyketone. 2-methyl imidazolium is more stable (no change at 2 M, 80° C. for 160; 5% degradation at 6 M, 80° C. for 10 h).

FIG. 3 shows the fabrication of a crosslinked PPO membrane by Precursor A and Precursor B. Quaternization and crosslinking happen simultaneously.

Figure 4:
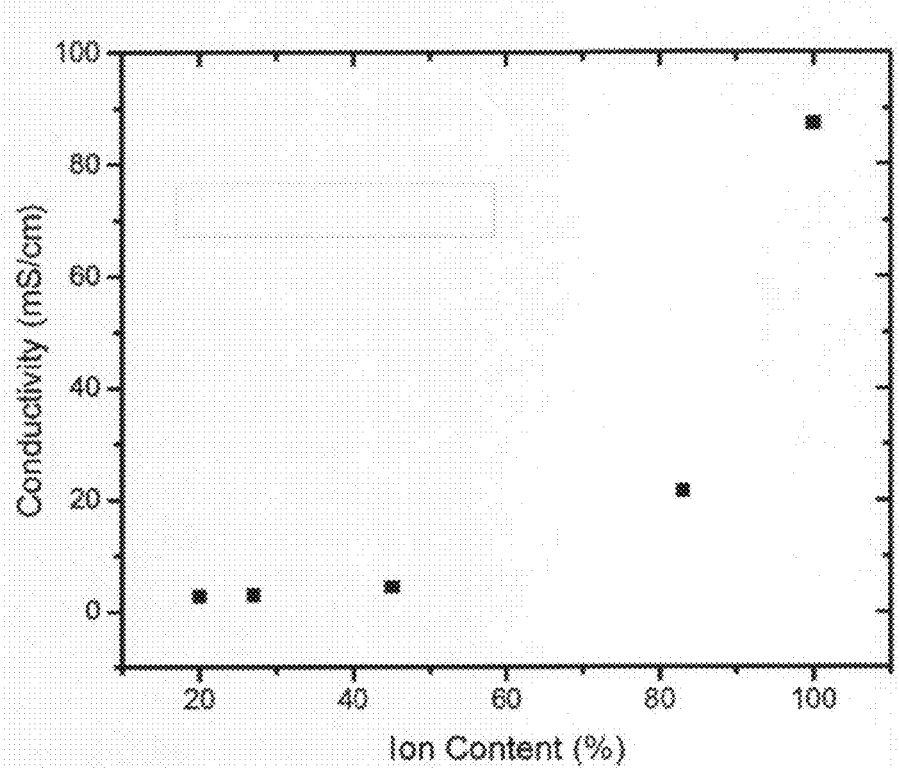
FIG. 4 shows the conductivities of crosslinked PPO membranes as a function of ionic contents.
Figure 5:
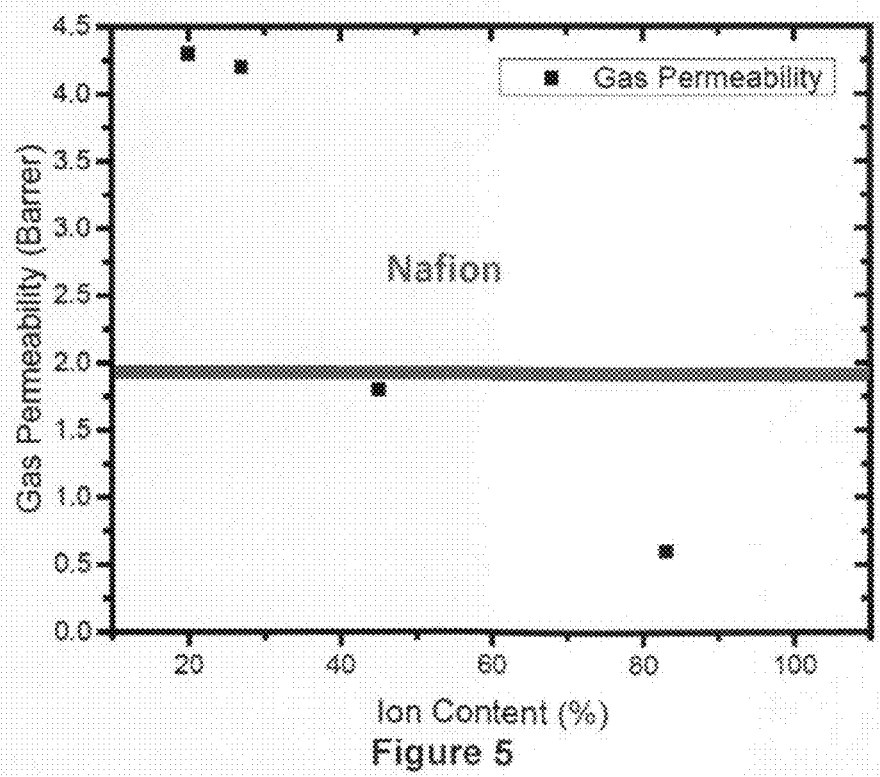
FIG. 5 shows the dry $O_2$ permeability of crosslinked PPO membranes as a function of ionic contents.

The crosslinked PPO membrane exhibits high conductivity, good mechanical property and lower gas permeability compared to Nafion 117 as demonstrated in FIGS. 4 and 5. FIG. 4 shows the conductivities of crosslinked PPO membranes as a function of ionic contents. The hydroxide conductivity of PPO-imidazolium crosslinked membranes with constant crosslinking density as a function of ion content in membranes. FIG. 5 shows the dry $O_2$ permeability of crosslinked PPO-imidazolium membranes with a constant crosslinking density (14%) as a function of ionic contents.

When in aqueous solution, the ionic membranes with ionic content higher than 40% have very low $O_2$ permeability so that the instrument could not detect any $O_2$ cross over. Compared to the currently known membranes, the membranes fabricated using the method described herein is much simpler, and thus is of lower cost and higher efficiency.

Figure 8:
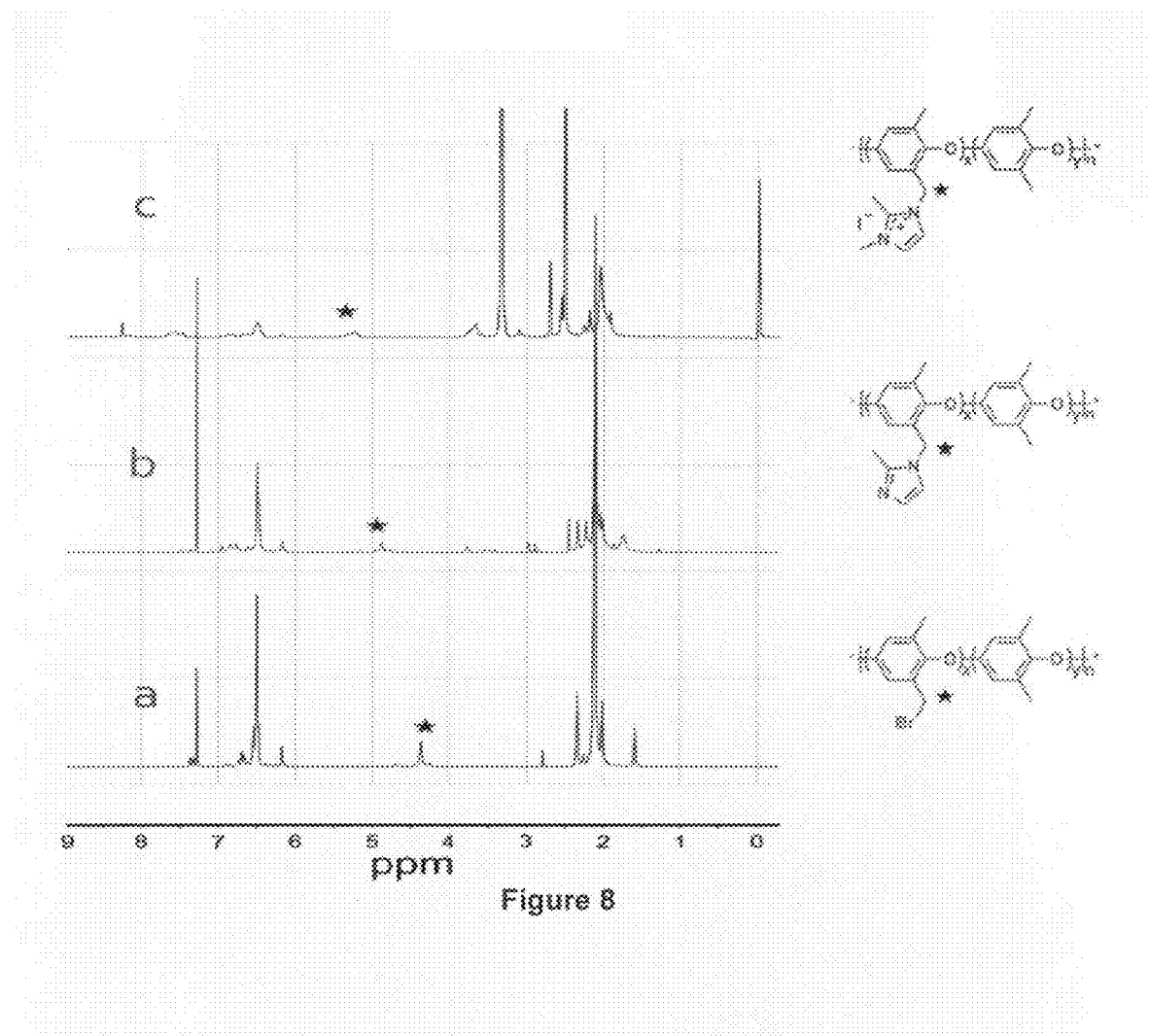
FIG. 8 shows the $^1H$ NMR spectra of PPO imidazolium ionomers with an ion content of about 20%: (a) brominated PPO, (b) PPO-imidazole, and (c) PPO-imidazolium, with F as a counter anion.

FIG. 8 shows the $^1$H NMR spectra of PPO imidazolium ionomers with an ion content of about 20%: (a) brominated PPO, (b) PPO-imidazole, and (c) PPO-imidazolium, with F as a counter anion.

Figure 9:
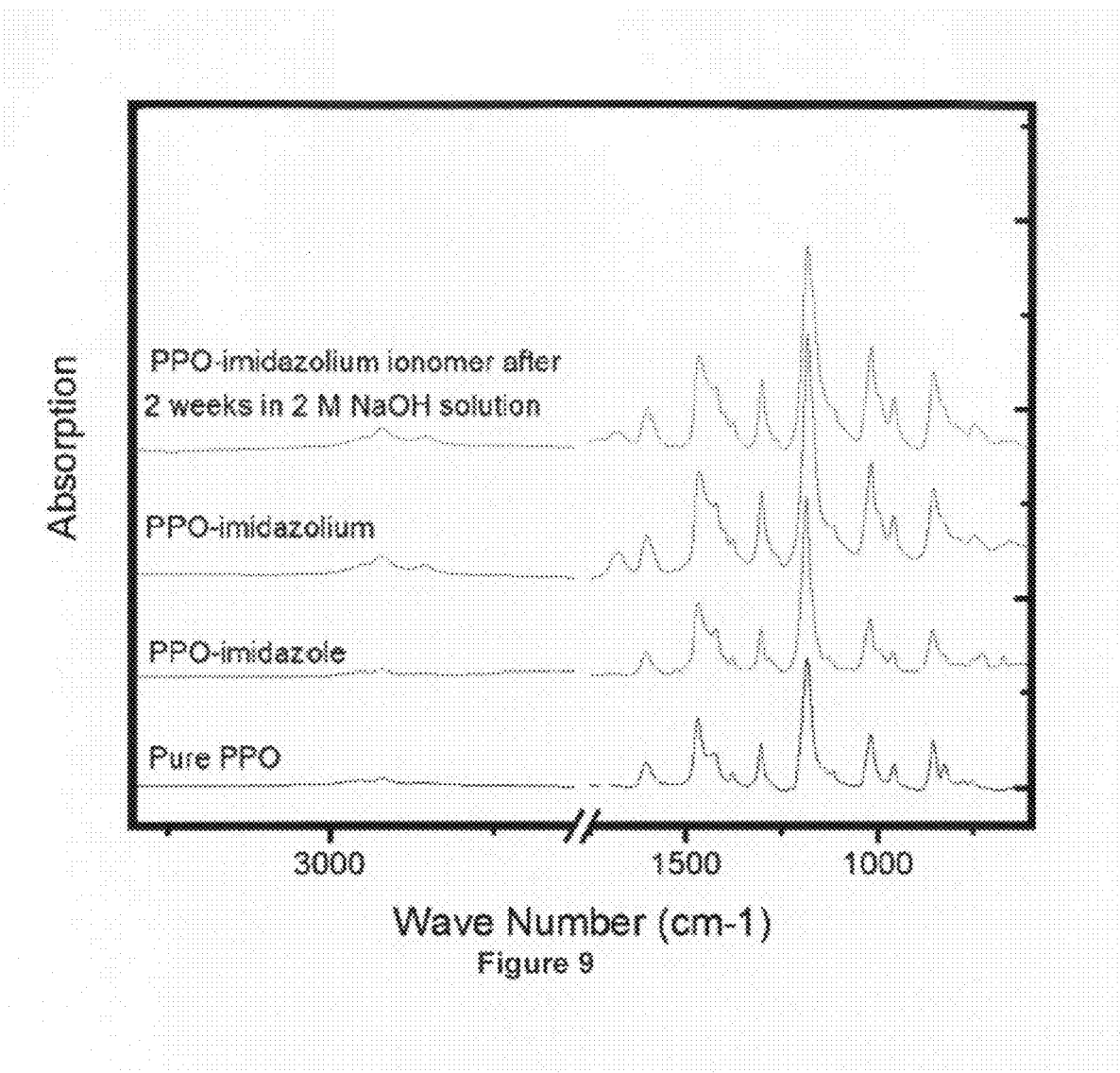
FIG. 9 shows the stability of membranes in base aqueous solution.

FIG. 9 shows the stability of membranes in base aqueous solution. FIG. 9 shows the FTIR spectra of PPO-imidazolium membrane with an ion content of about 20%. The conductivities of the membrane before and after being soaked in 2M NaOH aqueous solution at room temperature are 2.67 and 2.51 mS/cm (almost no change)

Figure 6:
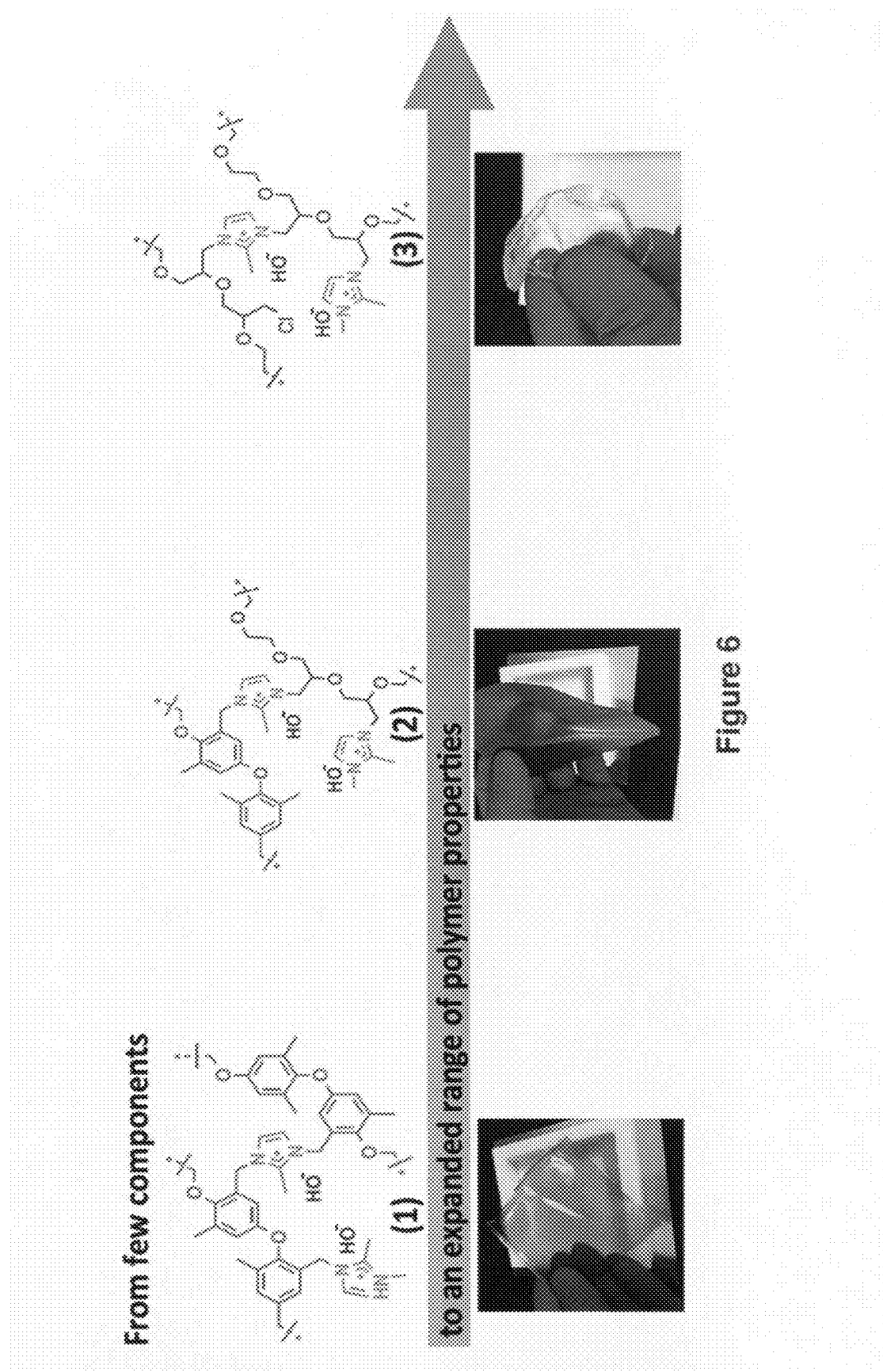
FIG. 6 shows a various polymers synthesized and tested.

Different polymers are synthesized as shown in FIG. 6 which displays a range of polymer properties.

Example 2

Poly(2,6-dimethyl phenylene oxide)-Based Nembranes with Anti-Correlated Transport Properties for Artificial photosynthesis Photoelectrochemical cells (e. g. artificial photo synthesis devices) running in alkaline solution offer many advantages over the devices running under acidic conditions, including a broader selection of earth-abundant catalysts for oxidation and reduction reactions of water and less expensive membranes. A permselective ion-conducting membrane is an indispensable component in a photoelectrochemical cell as an ion conductor, a products separator and a structural element. A series of cross-linked poly(2,6-dimethyl phenylene oxide) (PPO)-based anion exchange membranes with charged 2-methyl imidazolium moieties is synthesized using a reactive-blending strategy by mixing two PPO-based reactive polymer precursors, one with 20 mol % benzyl-bromide repeat units, and another one containing 20-100 mol % 2-methyl imidazole functional groups. The quaternization and cross-linking reactions occur simultaneously. Solid state $^{13}$C NMR spectroscopy and morphology studies of dry and hydrated membranes by AFM reveal that alkyl-bromide consumption (cross-linking reactions) do not go to completion until the 2-methyl imidazole content is over 41 mol %. The conductivities of those membranes can reach as high as 87 mS/cm while maintaining a low water uptake. In aqueous solution, the $H_2$ permeability of PPO-based cross-linked membranes is about a quarter that of un-pretreated Nafion 117 membrane and the methanol permeability is about one order less than that of un-pretreated Nafion 117. An electrolysis device assembled with PPO-based membrane has similar performance to the device running with Selemion membrane although the conductivity of Selemion membrane is higher; while the PPO-based membranes possess better stability in alkaline solution indicated by X-ray photoelectron spectroscopy (XPS) and FTIR spectroscopy.

Introduction

Artificial photosynthesis (AP) is the generation of liquid or gaseous fuels via photoelectrochemical electrolysis using sunlight, water, and carbon dioxide as the only precursors.[1,2] While efficient light absorption materials and catalysts converting water and/or carbon dioxide into oxygen/hydrogen or carbon containing fuels are prerequisite, sustained and efficient operation is enabled by incorporation of all components into a single system that is coupled via an ionically conductive membrane preventing the cross-over of the generated fuels onto the opposite electrodes.[3,4]

Berger et al[5] defined the materials design criteria for the membrane in an integrated solar fuel generator by numerically solving the governing equations for a photoelectrochemical water electrolysis cell as a function of the membrane properties. Nafion was used as a reference case. They claimed that the primary consideration for device performance was membrane permeability to the resultant fuels. For example, decreasing $H_2$ permeability from the reported value for Nafion ($\psi_{Nafion}=1.6\times10^{-11}$ mol/cm-s-bar) to 0.1 $\psi_{Nafion}$ resulted in an increase in the efficiency of $H_2$ production by 63.5%. And decreasing the membrane permeability further to 0.01 $\psi_{Nafion}$ resulted in an overall increase in efficiency of 74.5%. Further decreases in permeability resulted in negligible increases in efficiency, suggesting that, at this stage, the membrane was no longer a performance-limiting factor.

Figure 11:
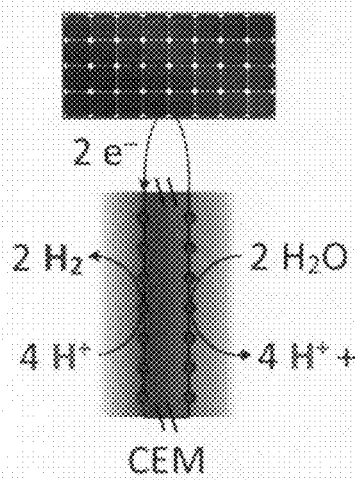
FIG. 11 shows artificial photosynthesis or photovoltaic-driven water electrolysis can be accomplished under acidic or basic conditions. The cation, or anion exchange membrane (CEM, or AEM, respectively) conducts charged species, but reduces the crossover of products ($H_2$, $O_2$). Basic hydrolysis is generally preferred and necessitates the development of AEM materials.
Figure 11:
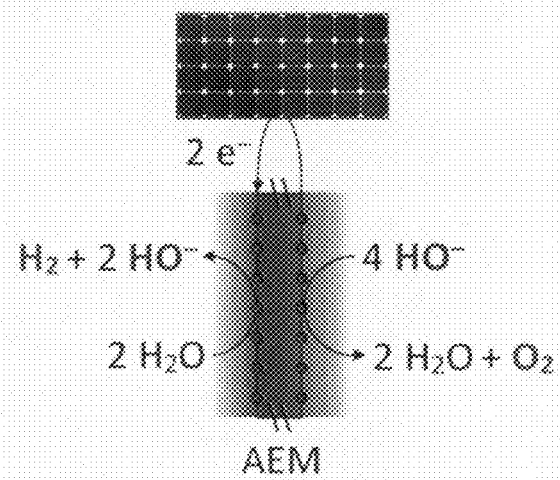

Photoelectrochemical water electrolysis is typically carried out under either acidic or basic conditions. The reaction scheme and generic device architecture for photoelectrochemical water electrolysis under acidic conditions is shown in FIG. 11. Under acidic conditions, water is oxidized at a catalyst surface to generate oxygen gas and protons. The liberated electrons are used to reduce the protons to hydrogen gas. A membrane is required to conduct protons (reactant), and to limit the permeation of the gas products. In this case, a cation exchange membrane (CEM) is required. Several systems have been reported for operation in solar fuels generators operating under acidic conditions.[6] A drawback of operation under acidic conditions is the limited resource of precious metal catalyst for water oxidation.[7] Under basic conditions, numerous Earth-abundant catalysts are available for water oxidation with reasonable catalyst overpotentials. As a result, anion exchange membranes (AEMs) for artificial photosynthesis devices running in alkaline solution have attracted much attention.

One of the most studied polymer matrices for high performance AEMs is poly(2,6-dimethyl-1,4-phenylene oxide) (PPO),[8-11] attributed to its stability in alkaline solution. As stated by Hickner, Herring and Coughlin,[11] PPO, unlike poly(sulfone)s or poly(ketone)s, does not have strong electron withdrawing groups that can decrease the electron density on the polymer chain and promote chain scission. Loss of cations from the AEM polymer chains in high PH aqueous environment is another concern. Different cationic groups such as guanidinuim,[12] DABCO salt[13] and substituted imidazolium[14,15] have been proposed. Lin and co-workers[14] compared the stabilities of polymers carrying different substituted imidazolium side groups. They concluded that 2-methyl imidazolium had the best chemical stability. It stayed intact after being immersed in 2M KOH solution at 80° C. for 168 hours. The stability was attributed to the combination of steric effects and the highest LUMO energy.

In order to advance the reliable and cost-efficient AEMs in APC devices, herein is reported the synthesis of a new membrane platform that fulfills the requirements of low permeability, sufficient anion transport, and hydrolytic stability under high PH conditions. In this membrane, 2-methyl imidazolium moieties are incorporated into PPO matrix, providing hydroxide conduction, and crosslinking sites for control over permeability of the neutral fuels.

Figure 12:
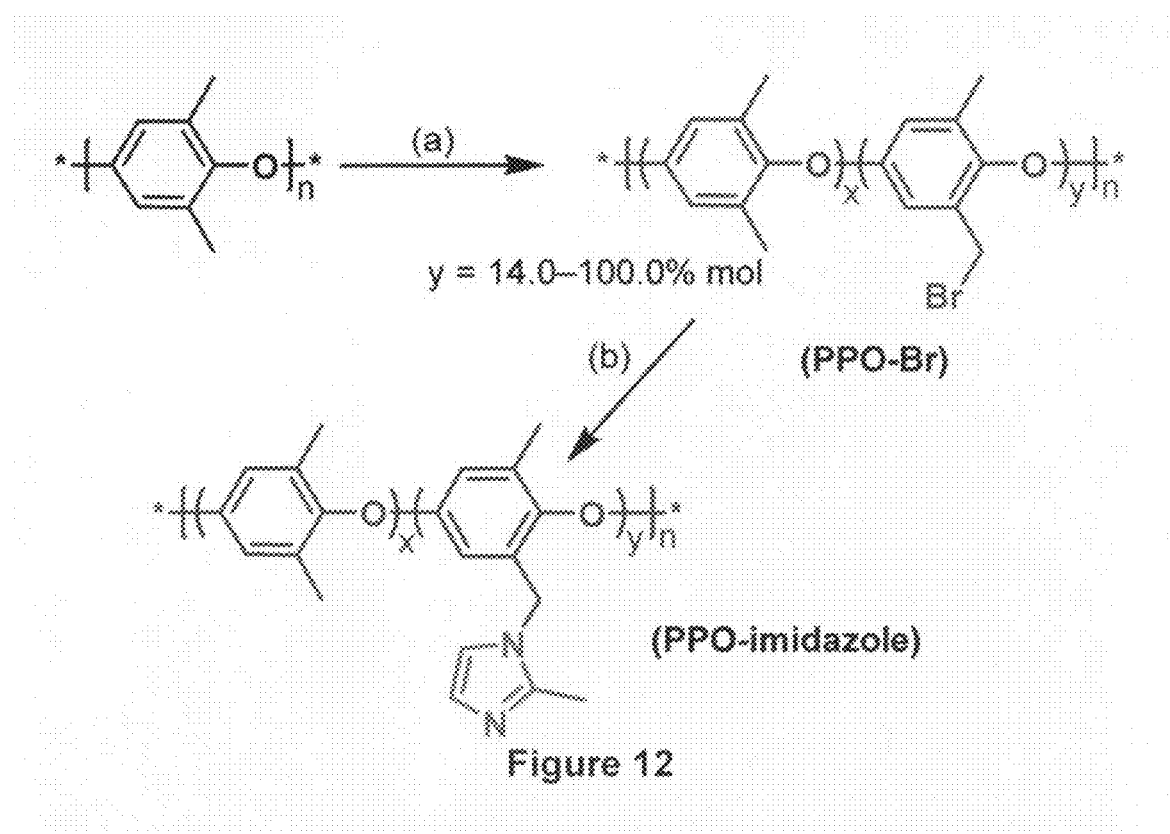
FIG. 12 shows a synthetic design of PPO-based AEM membrane precursors: (a) Bromination with NBS. (b) 1. NaH/THF, 2. 2-methyl imidazole/DMF.
Figure 13:
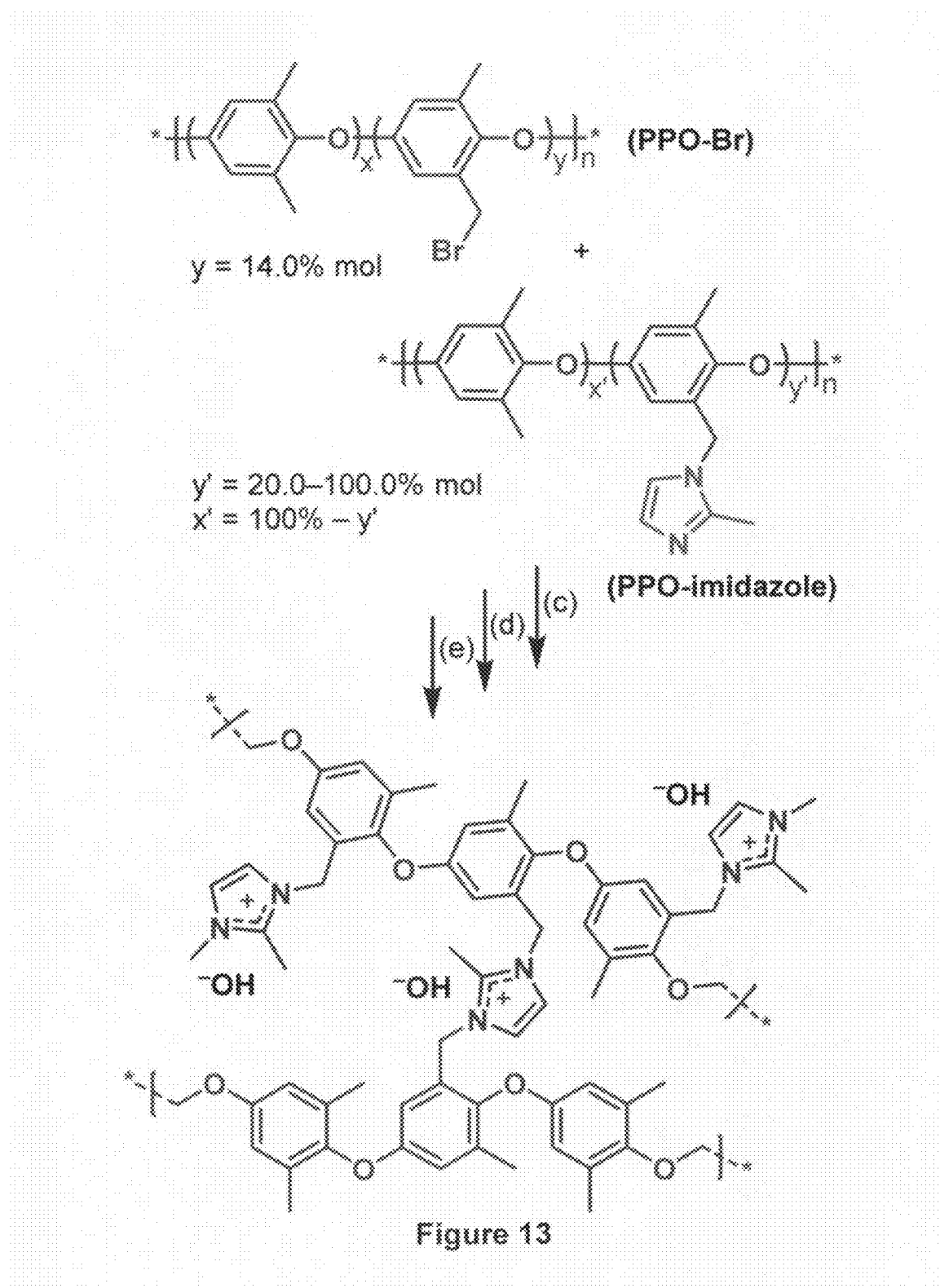
FIG. 13 shows a synthetic design of crosslinked PPO-based AEM membranes. (c) chlorobenzene/NMP. (d) MeI. (e) ion exchange with 2M KOH solution.

A synthetic strategy, shown in FIG. 12, begins with the synthesis of two polymer precursors: The first is a brominated poly(2,6-dimethyl phenylene oxide) (PPO-Br), and the second is a derivative of PPO-Br where the bromide is displaced by 2-methyl-imidazole (PPO-imidazole). To cast a membrane, PPO-Br and PPO-imidazole are blended and allowed to react forming a crosslinked network with positively charged 2-methyl imidazolium groups comprising the crosslinking sites (FIG. 13). The bromination degree of (PPO-Br) is fixed at 20 mol % and the composition of (PPO-imidazole) is varied from 20-100 mol %. The utility of this method is in decoupling of ion and gas transport by providing orthogonal control over mechanical and transport properties.

Experimental Section
Materials

Poly(2,6-dimethyl phenylene oxide) is purchased from Sigma Aldrich and used without further purification. The molecular weight ($M_n$) of the polymer is 50 kg/mol with a polydispersity index (PDI) of approximately 5 relative to polystyrene standards. Nafion membranes is purchased from Ion Power and used without pretreatment by acid. Selemion AMV is purchased from Asahi Glass. N-bromo succinimide (NBS), dicumyl peroxide, chlorobenzene, chloroform, methanol, anhydrous DMF, 2-methyl imidazole and N-methyl pyridine (NMP) are purchased from VWR and used without further purification. Anhydrous THF (inhibitor free) is dispensed from a solvent purification system manufactured by J. C. Meyer.

Synthesis
Example Procedure of synthesis of brominated PPO (Precursor A).

According to a reported method,[16] 9 g PPO and 20 g N-bromo succinimide (NBS) are dissolved in 200 ml chlorobenzene. The mixture is bubbled by nitrogen for 30 minutes before being heated to 133° C. 2.1 g dicumyl peroxide is then charged into the solution and the whole mixture is stirred at 133° C. for 4 hours. After cooling, the brominated PPO is precipitated from 200 mL methanol and washed by methanol 2×200 mL. The product is re-dissolved into 100 mL chloroform and precipitated out from 400 mL methanol. This procedure is repeated twice. The final product is dried in a vacuum oven to afford 100% brominated PPO polymer (PPO-Br) as a grey solid.

Example Procedure of synthesis of PPO with 2-methyl imidazole Side Chain (Precursor B).

1.1 g 95% NaH and 3.7 g 2-methyl imidazole are charged into 40 ml anhydrous DMF. The solution turns clear after 1 h reaction at room temperature. Then a solution of 4.5 g brominated PPO in 60 ml dry THF is transferred into the sodium 2-methyl imidazole solution by cannula. The reaction solution is stirred overnight and then poured into 1000 mL water to precipitate out the product. The product is washed by 200 mL water three times before drying in vacuum oven to afford 100% functionalized PPO with imidazole side chain (PPO-imidazole) as a brown powder.

General Procedure of Preparation of Cross-Linked PPO imidazolium Membrane.

A solution of 0.15 g brominated PPO in 10 ml chlorobenzene and a solution of 0.15 g of PPO-imidazole in 10 ml NMP are mixed together and stirred for half an hour. Then calculated quantity of methyl iodide for alkylating the residue imidazole groups are charged into the mixture. The mixture is poured into a Teflon model and dried at 45° C. in oven. After 24 hours, the resultant membrane is further dried at 75° C. in vacuum oven to completely remove the solvent. The crosslinked membrane is removed from the substrates by blades.

Solid-State $^{13}$C NMR Spectroscopy $^{13}$C cross-polarization magic-angle spinning (CP-MAS) NMR experiments are conducted on a Bruker Avance 11-300 wide bore spectrometer at 75.47 MHz $^{13}$C frequency. For sample preparation, PPO-imidazolium cross-linked membranes and polymer precursors are tightly packed into 4 mm $ZrO_2$ MAS rotors. The MAS spinning speed is set at 6.25 kHz, and the CP contact time is 1 ms, 2048 to 4096 scans are performed to obtain sufficient signal-to-noise ratio, and with a recycle delay time of 3 s. A TOSS (total suspension of spinning sidebands) pulse sequence is applied at a radio frequency (rf) field strength of 85 kHz, which combines related CP-MAS experiments in order to minimize sidebands for all $^{13}$C spectra. Furthermore, small phase incremental alternation with 64 steps (SPINAL-64) decoupling sequence at 62.5 kHz is used during $^{13}$C detection for proton decoupling.

Infrared Spectroscopy

FTIR experimental data are collected by a Bruker Vertex 70 spectrometer with an ATR cell setting. Dry polymer membrane samples are pressed against the diamond ATR window and 512 scans are performed within a wavenumber range of 600 to 3300 $cm^{-1}$.

Conductivity

The in-plane proton conductivity (a) of the membranes is measured by a four-point-probe AC impedance method. The membranes are mounted on a four-electrode BekkTech conductivity cell. Impedance data are acquired using a Bio-logic SAS VSP300 LCR meter (E4980) over the frequency range from 1 Hz-3 MHz with 10 mV applied potential. The intercept of the Nyquist semicircle on the real axis is used to determine the total resistance. The conductivity measurements under fully hydrated conditions at room temperature are performed with the samples immersed in water and the measurements are repeated until reproducible results are achieved (the membranes reached quasi-equilibrium swelling conditions).

Ion Exchange Capacity

Ion exchange capacity (IEC mmol/g) is calculated from the molar concentration of 2-methyl imidazole group based on proton NMR spectra.

Water Uptake ($\lambda$)

Water uptake $\lambda$, is defined as the moles of water per mole of 2-methyl imidazolium groups in the membranes. To decide $\lambda$, the pre-dried membranes are weighed and then immersed into DI water for at least 48 hours to reach equilibrium. After excess water is removed, the fully hydrated membranes are weighed again. $\lambda$ is calculated by the following equation:

$$\lambda = \frac{W_{wet} - W_{dry}}{M_{H2O}} \bigg/ \frac{W_{dry} \times wt\ \%}{M} \tag{1}$$

where $W_{wet}$ and $W_{dry}$ are the weight of fully hydrated and dry membranes respectively. Wt % is the weight percent of 2-methyl imidazolium in the membranes, which is calculated based on proton NMR spectra. $M_{H2O}$ and M are the molecular weight of water and 2-methyl imidazolium respectively.

Atomic Force Microscopy (AFM)

Atomic force microscopy (AFM) images are collected by a Bruker Dimension Icon operating in Tapping mode using Bruker TAP 150A probes (Sb doped Si; Spring constant: 5 N/m; Frequency: 150 kHz). The scan size is typically 1 μm×1 μm or 500 nm×500 nm. The images are analyzed using the AFM software NanoScope version 1.5. Curvature and slope are removed from an image by flattening. After flattening, the RMS roughness (root-mean-squared roughness) is calculated. The RMS roughness, Rq, is given by the standard deviation of the data, $$Rq = \sqrt{\frac{\sum_{n=0}^{N}(Zi - Zave)^2}{N-1}} \quad (2)$$

where $Z_{ave}$ is the average Z value within the given area, $Z_i$ is the current Z value, and N is the number of data points within a given area.

Gas Permeability Measurements

The gas permeability of the fully hydrated membranes is measured. The membrane is sandwiched between two plastic plates with dimensions L48×W48×T5 mm. Each plate has a round-shaped chamber in the center equipped with an inlet and an outlet for either gas or water. The diameter of the chamber is ~17 mm. And on the side of each plate which contacts membrane, there is a hole of 7 mm diameter as active gas diffuse area. On the left plate of the setup, the experimental gas is saturated with water vapor and enters through the cell inlet, flows tangentially across the surface of the membrane, and exits through the outlet into a flask of water open to the atmosphere. In this way, any pressure rise in the cell could be minimized. The flow rate is low (15 SCCM) to minimize gas transport through the membrane driven by pressure difference. On the right side, deionized water is circulated through the cell and a sensor. For the $H_2$ permeability measurement, $H_2$ is humidified by passing through a gas washing bottle full of water. A Unisense Hydrogen Sensor H2-100 for $H_2$ detection is used to measure the concentration of $H_2$ in the circulating water. The measurement of $H_2$ permeability is repeated three times for each sample; reported values are the average of these measurements.

The data are fitted to Eq. 3 to obtain the diffusion coefficient, D, and equilibrium gas solubility in the membranes, $C_0$. Then permeability of the membranes is calculated as a product of D and $C_0$.

$$y = \frac{ADC0}{L}\left(\frac{2}{\sqrt{\pi\tau}}\sum_{n=0}^{\infty}\exp\left[-\frac{(2n+1)^2}{4\tau}\right]\right) \quad (3)$$

Where $$\tau = \frac{tD}{L^2}$$

where y is the concentration of $H_2$ in water solution, which is obtained by assuming that the solubility of $H_2$ is linearly related to the response of the sensor, which is electric current. A is the active gas exchange area. L is the thickness of the membranes Methanol Crossover Measurement Methanol transport is characterized using direct transport measurements. Membranes are soaked in deionized water for at least 48 hours prior to beginning an experiment to ensure that they are fully hydrated. The membrane is mounted between two diffusion cell chambers (Adams and Chittenden, Berkeley Calif.) using silicone O-rings on each side of the membrane to prevent leaks. The diffusion cell chambers have a volume of 20 mL and an orifice of 1.5 cm diameter each. After assembly, one cell is filled with deionized water and the other is filled with 1.0M methanol solution. An in-situ ATR-FTIR probe (Mettler Toledo, Columbus Ohio) is inserted into the cell containing ultrapure water. After collecting a water background spectrum, infrared spectra are collected every five minutes for 48 hours. The height of the peak at 1021 cm-1 is correlated with methanol concentration using a calibration curve that is prepared by recording infrared spectra of standard solutions of 0.2, 0.4, 0.6, 0.8, and 1.0 M methanol.

Concentration data are fit to the following correlation[17, 18] to obtain the diffusive permeability of methanol in the membrane:

$$\ln\left(1 - 2\frac{M_t}{M_0}\right) = P\left(-\frac{2A}{Vl}t\right) \quad (3)$$

where $M_t$ is the methanol concentration at time t, $M_0$ is the methanol concentration of the donor solution (1.0M), P is the diffusive permeability, A is the membrane area available for permeation, V is the volume of the donor and receptor cells (20 mL), l is the membrane thickness, and t is the time.

Membrane Electrode Assembly (MEA) Device Measurements

The MEA cells are studied in 1M KOH aqueous solution with homemade NiFe as anode and NiMo as cathode.[19] The polymer membranes are sandwiched by the similar setup discussed above for gas crossover measurement, except that the round-shaped chambers are for reaction solution, electrodes and products. Chronoamperometry electrolysis experiments are conducted at 2 V for 3 hours. The measurement for each MEA is repeated three times; reported values are the average of these measurements.

Results & Discussion

Synthesis of Polymer Precursors

The polymer precursor is synthesized according to the synthesis route shown in FIG. 12. Commercially available poly(2,6-dimethyl-1,4-phenylene oxide) (PPO) is brominated by N-bromo succinimide (NBS) in chlorobenzene at approximately 133° C. Degree of bromination is controlled by the amount of NBS; more NBS is required for expected bromination than the stoichiometric amount. This reaction is conducted at 133° C. due to the fact that the reactions at low temperature might include side reactions e. g. bromination of benzene rings and consequently free radical initiator such as dicumyl peroxide with a long half-life time at such a high temperature is used.[16] 2-methyl imidazole is feasibly attached to the polymer to replace bromine. The success of the reactions is confirmed by the proton NMR spectra.

Membrane Fabrication

Cross-linking is expected to enhance the mechanical stability and decreasing gas/fuel permeation through membranes by limiting polymer chain movement, especially when hydrated. Utilization of imidazole as a cross-linking reagent for membranes has been established as an efficient way to improve the chemical, thermal and mechanical stability of polymers and to lower methanol crossover of polymeric membranes.[20, 21] To this end, the PPO-based polymers are cross linked using 2-methyl imidazole (FIG.

13). For the purposes of comparison, the crosslinking density is fixed by using the same PPO-Br polymer (20 mol % Br in the precursor) for all the membranes. And the ionic contents are varied by using PPO-imidazole with different imidazole contents from 20-100 mol %. To completely quaternize the excess imidazole groups, the rest of imidazole groups in the polymer are alkylated by methyl iodide.

Figure 14A:
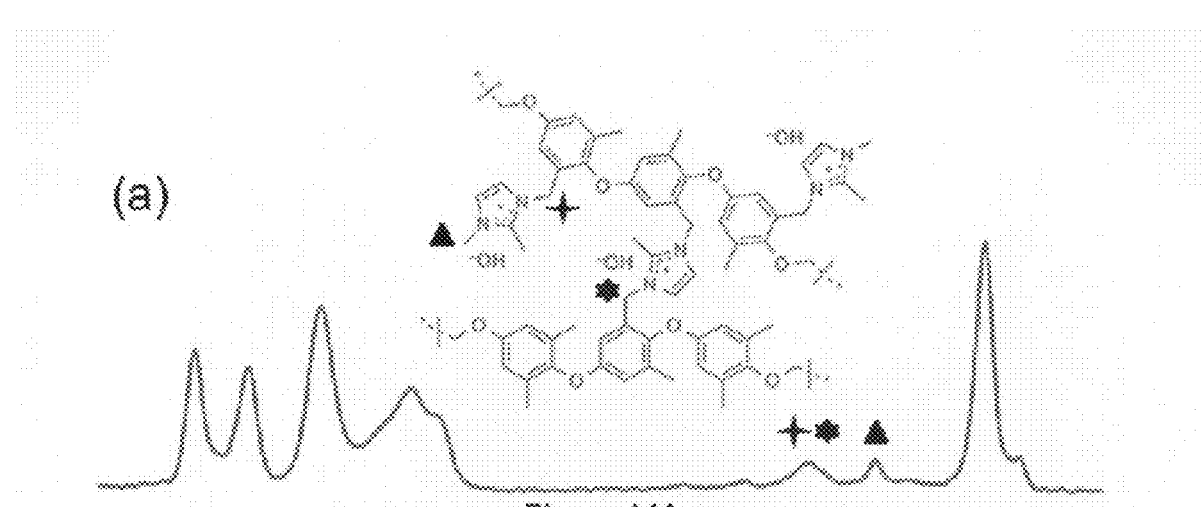
FIG. 14A shows a solid-state $^{13}$C NMR (CP-MAS) spectra of PPO-imidazolium cross-linked membrane made by precursors containing 20 mol % Br and 100 mol % imidazole, respectively.
Figure 14B:
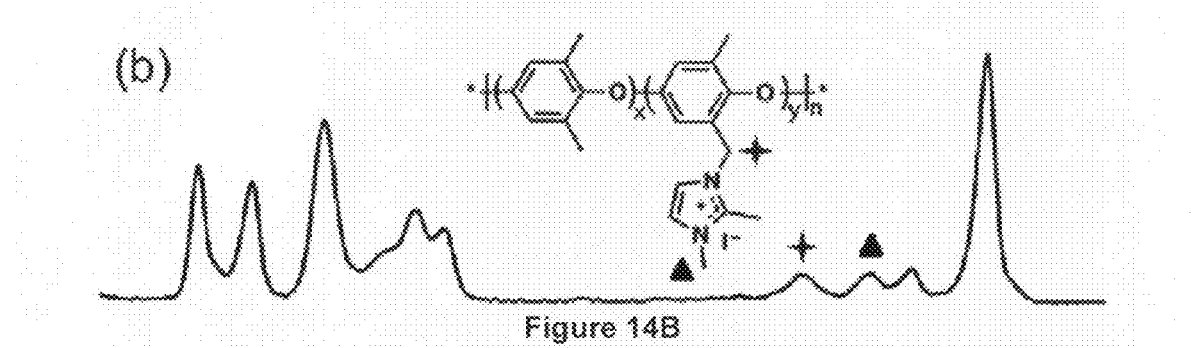
FIG. 14B shows a solid-state $^{13}$C NMR (CP-MAS) spectra of PPO-imidazole-MeI.
Figure 14C:
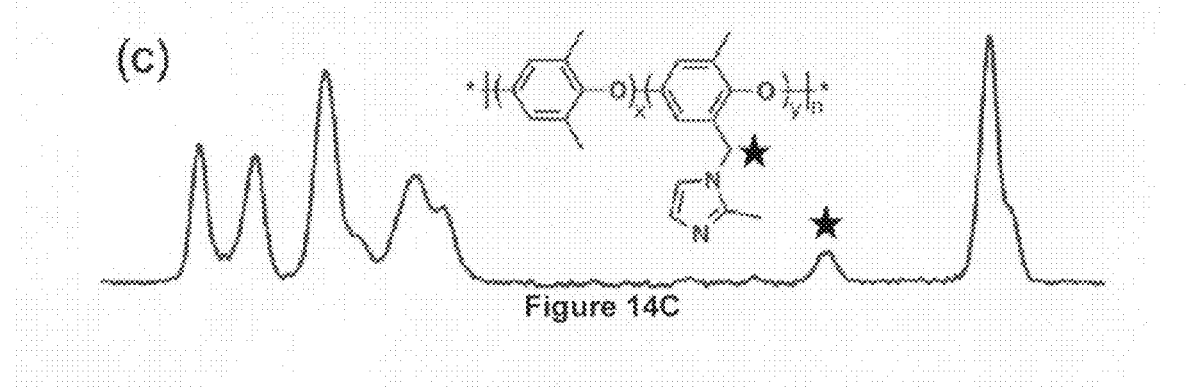
FIG. 14C shows a solid-state $^{13}$C NMR (CP-MAS) spectra of PPO-imidazole.
Figure 14D:
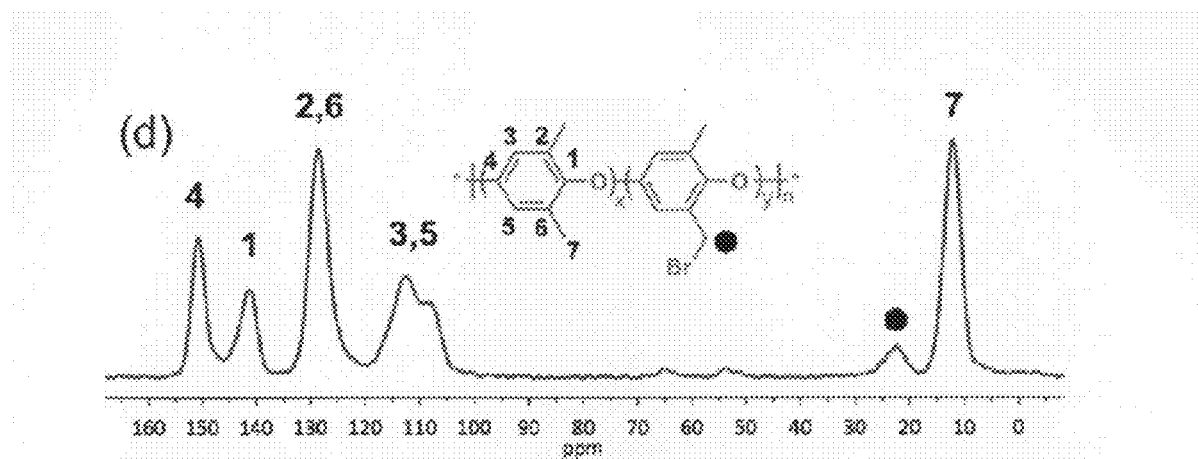
FIG. 14D shows a solid-state $^{13}$C NMR (CP-MAS) spectra of Brominated PPO.

The conversion rate of the cross-linking and quaternization reactions is assessed by $^{13}C$ solid-state NMR spectroscopy (FIGS. 14A to 14D). These spectra show that the three reactions of interest (1. replacement of Br by imidazole, 2. quaternization of the imidazole, and 3. cross-linking) proceed to create the final cross-linked membranes. The peak at 27.5 ppm in the spectrum of PPO-Br (FIG. 14D green curve) corresponds to the a carbons adjacent to Br. The disappearance of this peak in the spectrum of the cross-linked membrane is made by a 100% imidazole precursor and a 20% Br precursor (FIG. 14A, red curve) clearly show the complete consumption of the bromide precursor, indicating that the cross-linking reaction went to completion at this composition. In addition, compared to PPO-imidazole (FIG. 14C blue curve), the peak is assigned to the a carbons adjacent to imidazole groups downshifted about 4 ppm after quaternization of the imidazole groups (FIGS. 14A and 14B). This deshielding effect, due to the formation of the imidazolium cation, provides a further evidence for the quaternization reaction.

Membrane Morphology

Figure 15A:
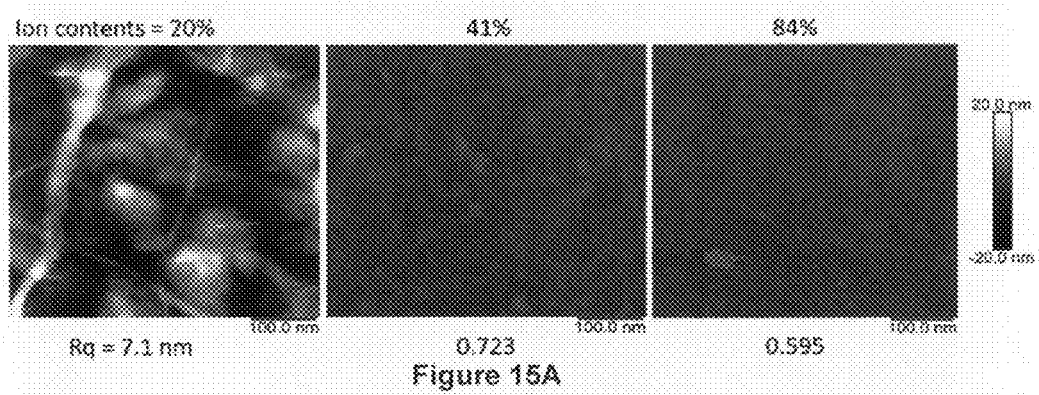
FIG. 15A shows AFM topography images of dry cross-linked PPO membranes by peak force tapping mode.
Figure 15B:
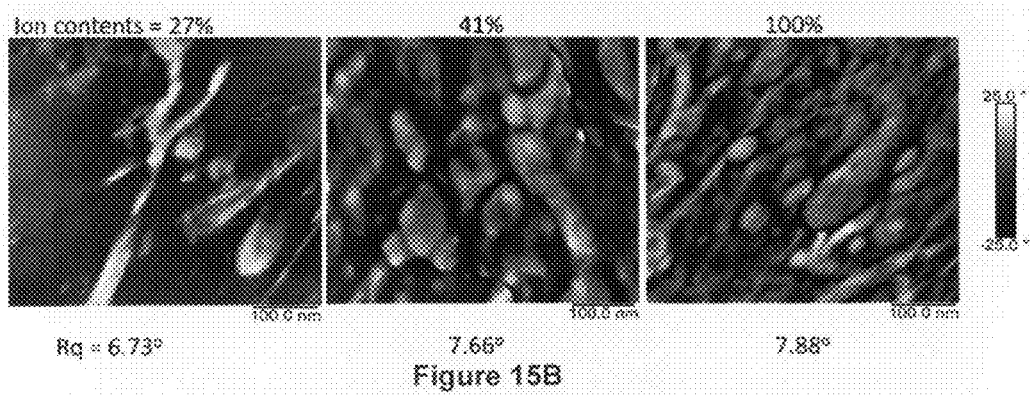
FIG. 15B shows AFM topography images of wet cross-linked PPO membranes by tapping mode with varying ion content.

The PPO backbone is hydrophobic and only part of benzene groups carry hydrophilic imidazolium groups. Thereby, in general, self-assembly, phase separation, and the formation of nano-structures might happen in these PPO based ionic membranes. Many other groups have observed phase separation and nano-domains in dry and hydrated PPO-based uncross-linked membranes by SAXS and AFM.[15,20,22,23] The morphology studies of the cross-linked membranes by AFM are shown in FIGS. 15A and 15B. These spectra clearly show the effect of cross-linking density and water content on the morphology of the cross-linked PPO membranes. For dry membranes (FIG. 15A, when ion content increased from 20 to 84 mol %, the roughness of the cross-linked PPO membranes decreases with increasing ion content and the membranes became increasingly, homogeneous. In other words, the size of segregated phases decreases with increasing ion content. This result suggests that the cross-linking density of the membranes increases as the imidazole content (ion content) in PPO-imidazole precursors increases. The roughness value reaches a minimum (around 0.6 nm) when ion content is over 84 mol %. The roughness Liu et al.[15] reported for uncross-linked dry PPO membranes with 46 mol % ionic groups is 1.37 nm, greater than the roughness of these PPO cross-linked membranes with 41 and 84 mol % ion content, which might be explained by the cross-linking structure in this system.

When the membranes are hydrated, the roughness of the membranes increased with ion content, as shown in FIG. 15B. This result is presumably due to the fact that higher ion content led to more water uptake. It is interesting to note that Liu et al.[15] studied their membranes by SAXS and they found phase sepapration, while our SAXS experiments did not show any notable features. This might be explained by the fact that the limited free volume by cross-linking structure for polymer chain reorganization resulted in ionic domains too small to be detected by SAXS.

Water Uptake and Conductivities

TABLE 1

Membrane transport properties.

| Membrane Ion Content (mol %)[1] | Ion Exchange Capacity (mmol/g)[2] | Water Uptake wt %/$\lambda$[3] | Conductivity (mS/cm) | $H_2$ permeability[4] | Methanol Crossover ($10^{-8}$ cm$^2$/S) |
|---|---|---|---|---|---|
| 20.0 | 0.76 | 5.1/2.88 | 2.67 | N/A | 1.27 |
| 27.2 | 1.03 | 4.0/1.73 | 2.93 | N/A | N/A |
| 41.0 | 1.57 | 8.0/1.50 | 4.38 | 0.18 | 0.72 |
| 83.7 | 3.25 | 28.5/7.05 | 21.6 | 0.20 | 1.12 |
| 100 | 4.31 | 37.8/8.56 | 87.3 | 0.24 | 14.3 |

(1) The PPO-Br has 20 mol % bromininated repeat units for all samples. Ion contents reported here represent the degree of imidazoliation of PPO-Imidazole. (2) The IEC is calculated based on the compositions of the PPO-imidazole precursors determined by $^1H$ NMR spectroscopy and assuming that quaternization of remaining methyl-imidazole groups is quantitative. (3) $\lambda$ is calculated using the IEC determined by $^1H$ NMR spectroscopy. (4) The $H_2$ permeability values are normalized by the result of Nafion 117.

Figure 16:
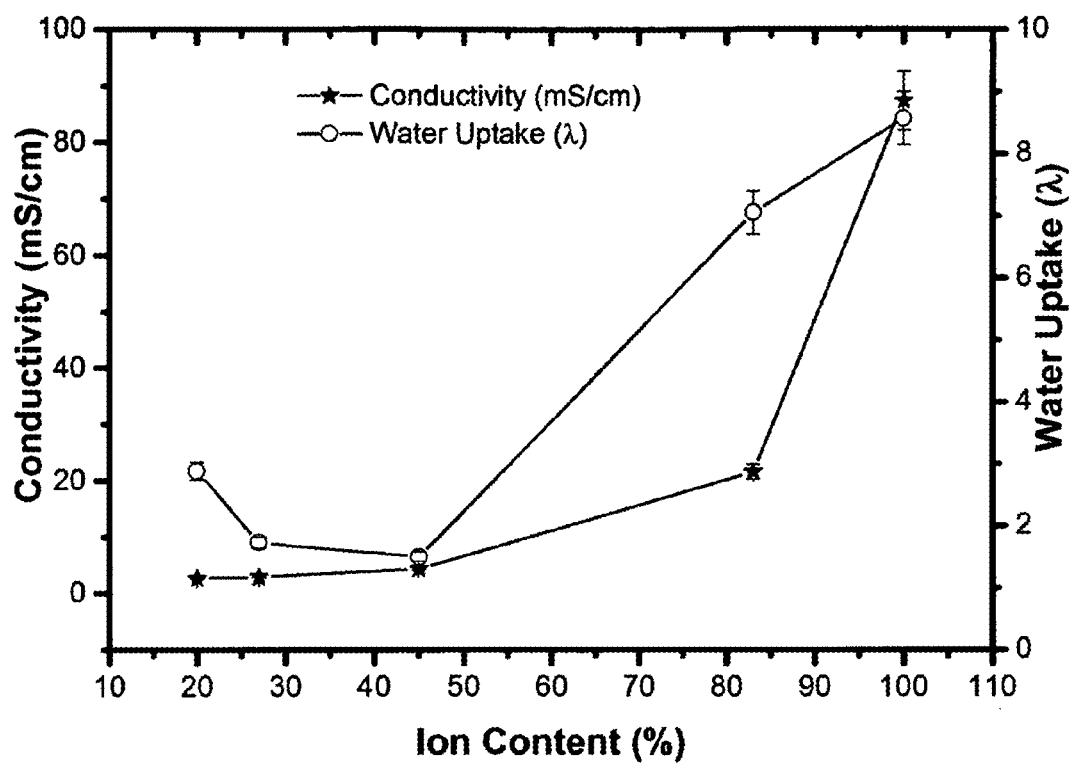
FIG. 16 show anion conductivities and water uptake of PPO-imidazolium cross-linked membranes with constant crosslinking density (20%) as a function of ion molar content in membranes. This figure shows the PPO cross-linked membranes have high alkaline conductivity and low water uptake.

It is hypothesized that cross-linking of the membranes would provide robust structural support and thus prevent the membranes from over hydrating. The cross-linked PPO membranes exhibited low water uptake. As shown in Table 1 and FIG. 16, the water uptake of PPO-based membranes is nearly constant in the ion content range of 20 to 41 mol % and strongly increased when ion content exceeded 41 mol %. As discussed in the previous section, the cross-linking reactions in these membranes do not go to completion when ion content is in the range from 20 to 41 mol %. Consequently, the water uptake of these membranes with ion content in the range of 20 to 41 mol % is controlled by the competition of cross-link density and ion content, which leads to slight changes in water uptake. When ion content exceeds 41 mol %, the cross-linking reaction is quantitatively completed and cross-link density is constant, resulting in water uptake controlled only by ion content. As a result, the water uptake of the membranes with ion contents greater than 41 mol % increased significantly with ion content.

The highest $\lambda$=8.56 is obtained for the membrane made by 100 mol % PPO-imidazole polymer precursor with an IEC of 4.3 mmol/g. Compared to Nafion 117, which has $\lambda$=21 with an IEC of approximately 1 mmol/g, the overall water uptake of cross-linked PPO-based membranes is extremely low, in accordance with PPO-based AEMs reported by other groups.[22,24] The low water uptake can be explained by a combination of hydrophobic properties of the PPO backbone and the fact that the cross-linked structure limited swelling of the polymer. Surprisingly, the conductivities are not affected by the cross-linking and reached values as high as 87 mS/cm (Table 1), among the highest values ever reported.

$H_2$ Permeability

Gas permeability is one of the most important factors affecting ionomeric membranes performance in electrolysis and APC applications. The ideal ionomeric membranes for water splitting devices would allow no hydrogen/oxygen or other fuel products to cross over the membrane while still conducting ion with minimal resistive losses. Increasing gas permeability can cause a number of undesirable effects, such as decreased purity of the gas product streams, increased rate of chemical recombination at the counter electrode, and catalyst poisoning, all of which lead to decreases in system efficiency.[3, 4] Furthermore, catastrophic failure could occur if the gas cross-over reaches the lower explosion limit for hydrogen (4%) in the oxygen stream.[25] In this section of the paper, we discussed the method used to evaluate the hydrogen permeability and compare the results to existing ionomeric membranes.

The testing method is modified from the one developed by Haug and White[26] for measuring $O_2$ permeability in proton exchange membranes. To eliminate the effect caused by the instrumental drift and obtain reasonable fitting parameters, each set of data is vertically moved to force the baseline of each curve starting from 0.

Figure 17:
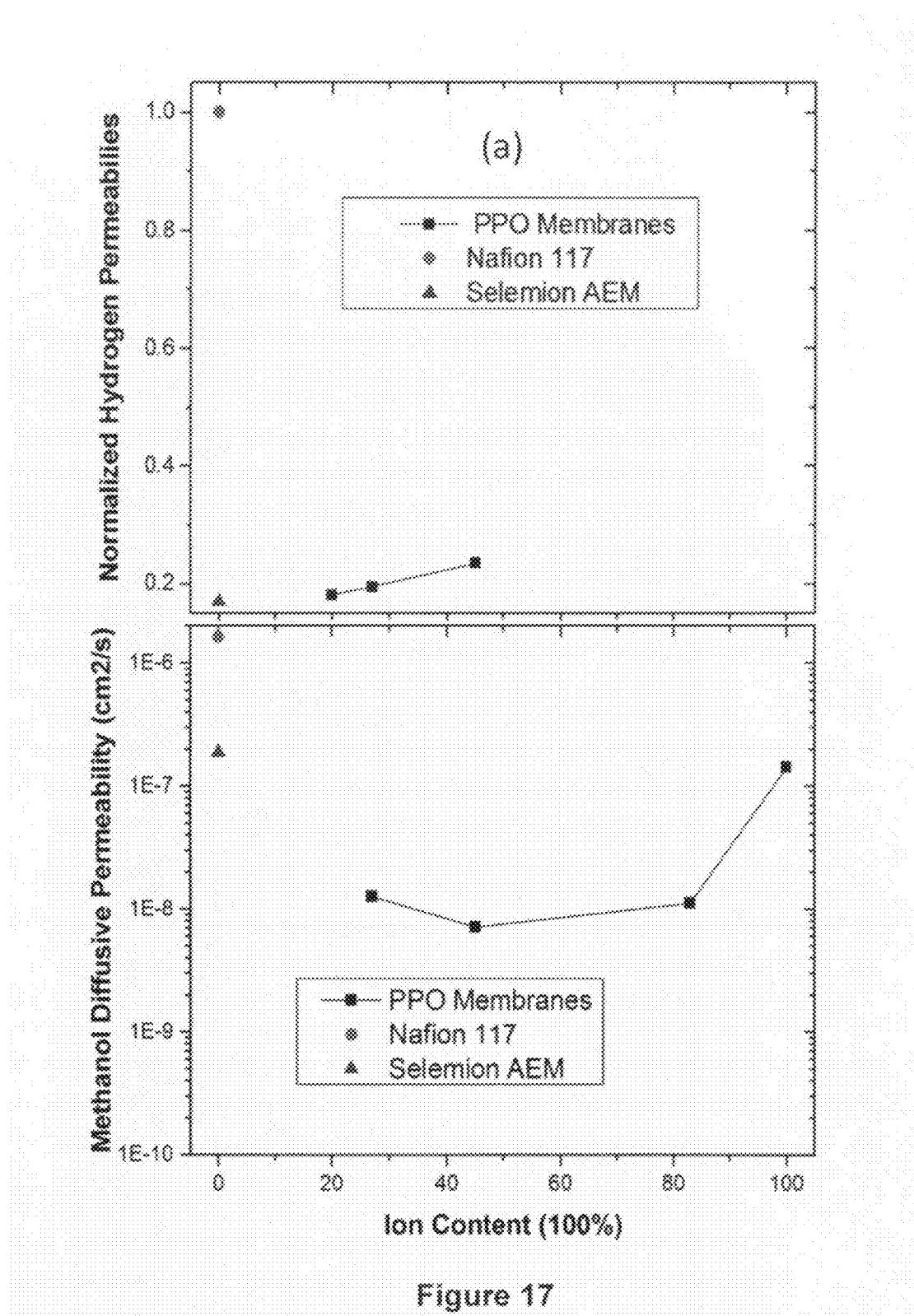
FIG. 17 shows: (a) $H_2$ permeability and (b) methanol crossover of PPO-imidazole cross-linked membranes with constant crosslinking density (20%) in water as a function of ion molar content in membranes. The $H_2$ permeability data are normalized by the measured permeability of Nafion 117. These figures prove that the PPO cross-linked membranes have excellent $H_2$ and methanol blocking properties compared to Nafion 117.

Hydrogen permeation results of cross-linked PPO membranes displayed in FIG. 17 demonstrated efficient $H_2$ blocking by our PPO-based cross-linking membranes. All $H_2$ gas permeability values are normalized by the experimental result of Nafion 117 membrane for comparison. The membranes based on PPO have hydrogen permeability less than a quarter that of Nafion 117. The gas permeability of our PPO membranes in water increases with ion content, which could be explained by the increased water uptake.

Methanol Transport

Methanol is one of the potential products of $CO_2$ reduction in artificial photosynthesis process. So methanol crossover through membranes is another essential parameters evaluating the performance of membranes.

The methanol permeability of the PPO-based crosslinked membranes is compared to that of Nafion 117 and Selemion Anion Exchange Membrane FIG. 17. It is found that, consistent with previous results, due to the competition between crosslinking density and ion content, the methanol crossover first decreased then increased with ion content increasing. The PPO-based membrane demonstrate at least one order lower methanol permeability than Nafion 117 and slightly lower than Selemion AMV membrane, which can be attributed to the crosslinked structure in our membranes.

Membrane-Electrode Assembly (MEA) Test with Membranes

An artificial photosynthesis assembly is an integration of multiple materials (light absorbers, catalysts, membrane) with different functions and all of these must function together. One of the key elements for artificial photosynthesis and electrolysis assemblies is the membrane-electrode assembly (MEA), which consists of anode, cathode and ion-conducting membrane.

MEA performance is defined by the ohmic drops due to ion transport resistance and crossover losses by the migration of products ($H_2$ and $O_2$ in this case). It is desirable to minimize gas crossover to maximize system performance while keeping reasonable conductivity. There are always tradeoffs between those two factors when selecting membranes.[3]

Figure 18:
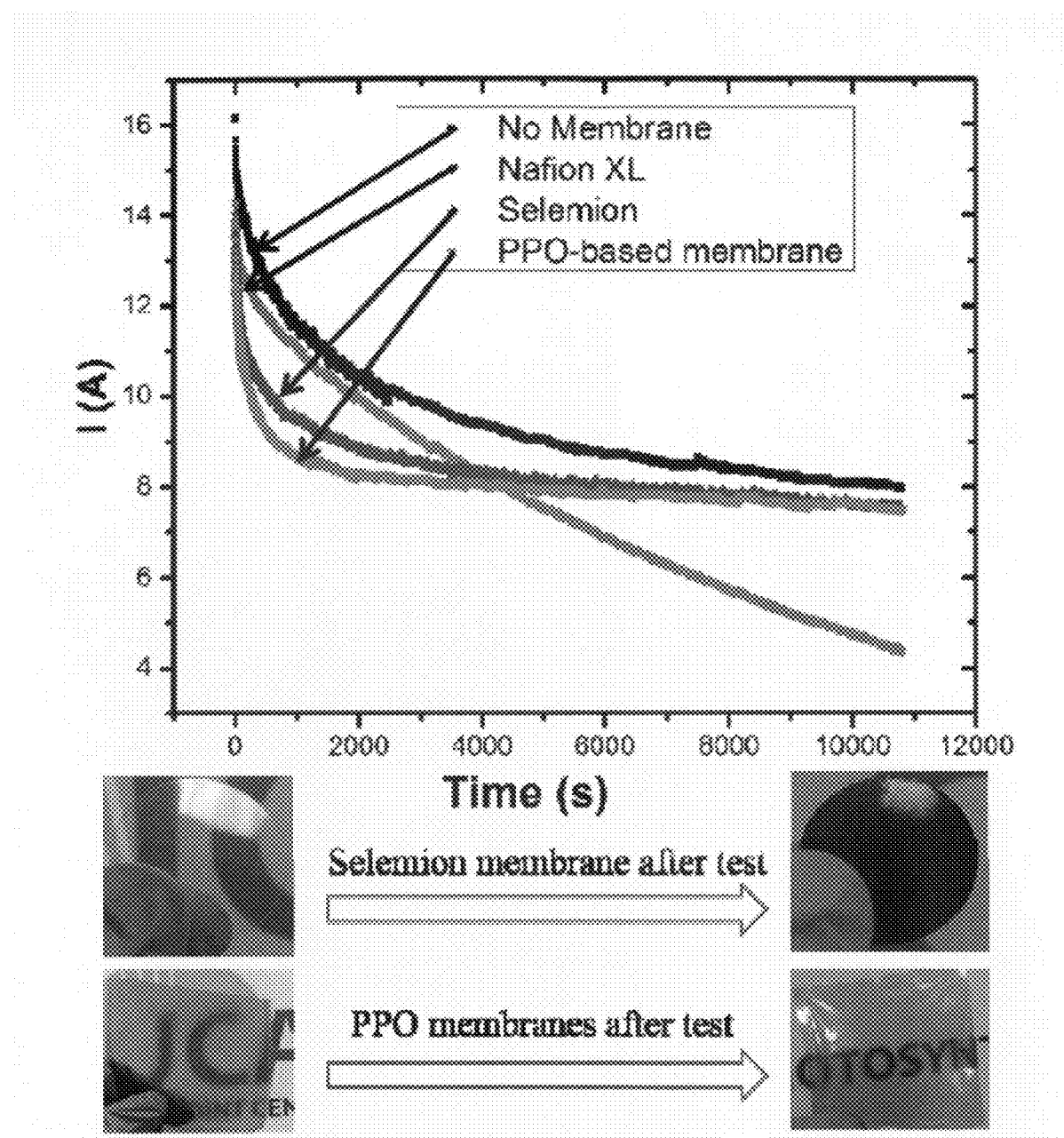
FIG. 18 shows the performance of MEA devices with different ion-conducting membranes. The blue and red lines are results from Selemion AMV membrane and Nafion XL, respectively. This demonstrates that our PPO-based membranes have the same performance as Selemion membrane. In the meantime the PPO-based membranes possess better chemical stability in alkaline solution

The MEA cells are tested by chronoamperometry electrolysis (constant potential) experiments. FIG. 18 displays the results of MEA cells assembled with different membranes. As a reference scenario, a blank cell without membrane is also tested. The configuration without a membrane has the highest operating current but also the greatest current drop possibly due to the greatest amount of recombination and product cross-over and is therefore not a realistic configuration for electrolysis or AP applications. The Nafion membrane-containing cell shows the worst performance as the result of poor conduction of hydroxide ion under the current experimental condition. The PPO-based membrane with ion content of 100 mol % exhibits similar performance to Selemion AEM after 3 hours, although Selemion AEM has about twice the conductivity of PPO-based membranes. This could be caused by the stability of AEM membranes in 1M KOH solution, or by the differences in ion aggregations between the two membranes[27] that are not probed effectively using simple conductivity measurements.[28]

Stability in Alkaline Solution

The PPO-based membranes have excellent stability in base solution. After the MEA test in base solution, the membranes are autopsied to assess their stability in alkaline solution. The PPO-based membrane appears to keep the same or even lighter yellow color after the MEA test. In contrast, Selemion AEM quickly degrades in high PH solution, as indicated by a color change from transparent and colorless to dark brown (FIG. 18). The degradation and dark color would be a significant issue when being integrated into real artificial photosynthesis devices. In addition, the nearly identical FTIR spectra of PPO membrane before and after soaking in 1 M KOH solution for two weeks demonstrated the stability of our PPO membranes in a basic environment.

It is hard to study Selemion AEM by FTIR due to the fussy background. Therefore XPS (X-ray Photoelectron Spectroscopy) is used to investigate the degradation of Selemion AEM in alkaline solution. Selemion AEM is believed to be a blend of PVC and functionalized polystyrene.[29] C—Cl bond is unstable in alkaline solution. The Cl content of Selemion membrane decreases about a half, from 1.5% to 0.8% (the data are normalized to the C content) demonstrated by XPS measurement, which concludes the instability of Selemion membranes in alkaline solution.

CONCLUSION

In summary, a group of anion exchange membranes based on poly(phenylene oxide) is successfully synthesized via in situ quaternization and cross-linking of PPO polymer precursors. The final cross-linked membranes have ion contents ranging from 20 to 100 mol %. Compared to expensive Nafion membranes,[30, 31] the process to prepare PPO cross-linked membranes is simple and potentially lower cost.

Solution-state proton and solid-state $^{13}C$ NMR spectroscopy confirm the structure of the membrane precursors and cross-linked membranes. The Br of PPO-Br cannot be quantitative consumed unless the 2-methyl imidazole content in PPO-imidazoles is much greater than the Br content.

The PPO-based crosslinked membranes exhibit lower water uptake than Nafion. The water uptake of PPO-based membranes show a maximum value of 8.6 at the highest IEC of 4.3 mmol/g. The low water uptake is believed to be a consequence of the cross-linked polymer structure. Conductivity is as high as 87 mS/cm at room temperature for cross-linked membranes with 100% ion content.

Finally, these PPO-based membranes demonstrate high performance in MEA cells. Their hydrogen/methanol permeability is lower than that of Nafion 117. Compared to Selemion AEM, the membranes have superior chemical stability in the high PH working environment of artificial photosynthesis devices. All of these properties derive from the cross-linking structure, stable PPO backbone and robust 2-methyl imidazole moieties.

References Cite in Example 2

1. Listorti, A.; Durrant, J. and Barber, J. Nat. Mater., 2009 8, 929
2. Walter, M. G.; Warren, E. L.; Mckone J. R.; Boettcher, S. W.; Mi, Q.; Santori, E. A. and Lewis, N. A. Chem. Rev., 2010, 110, 6446.
3. Haussener, S.; Xiang, C.; Spurgeon, J. M.; Ardo, S.; Lewis, N. S. and Weber, A. Z. Energy Enviro. Sci., 2012, 5, 9922.
4. Newman, J. Journal of The Electrochemical Society, 2013, 160, F309.
5. Berger, A.; Segalman, R. A. and Newman, J. Energy Environ. Sci., 2014, 7, 1468.
6. Schenider, Y.; Modestino, M. A.; McCulloch, B. L.; Hoarfros, M. L.; Hess, R. W.; Segalman, R. A. Macromolecules, 2013, 43, 4615.
7. McCrory, C. C. L.; Jung, S.; Peters, J. C. and Jaramillo, T. F. J. Am. Chem. Soc., 2013, 135, 16977.
8. Xu, T. and Yang, W. Journal of Membrane Science, 2001, 190, 159.
9. Xu, T. and Zhang, F. Journal of Membrane Science, 2002, 199, 203.
10. Ran, J.; Ru, Y.; Hu, M.; Din, L. and Xu, T. Polym. Chem., 2015, 6, 5809.
11. Hickner, M. A.; Herring, A. M.; Coughlin, E. B. Journal of Polymer Science, Part B: Polymer Physics, 2013, 51, 1727-1735.
12. Zhang, Q. A.; Li, S. H.; Zhang, S. B. Chem. Commun., 2010, 46, 7495-7497.
13. Guler, E.; Zhang, Y. L.; Saakes, M.; Nijmeijer, K. Chemsuschem, 2012, 5, 2262.
14. Lin, B.; Dong, H.; Li, Y.; Si, Z.; Gu, F. and Yan, F. Chem. Mater., 2013, 25, 1858-1867.
15. Liu, Y.; Wang, J.; Yang, Y.; Brenner, T. M.; Seifert, S.; Yan, Y.; Liberatore, M. W. and Herring, A. M. J. Phys. Chem. C, 2014, 118, 15136-15145.
16. Liska, J.; Borsig, E.; Tkac, I. Die Angewandte Makromolekulare Chemie, 1993, 211, 121.
17. H. Yasuda, C. E. Lamaze, L. D. Ikenberry, Die Makromol. Chemie., 118 (1968) 19-35.
18. H. Yasuda, L. D. Ikenberry, C. E. Lamaze, Die Makromol. Chemie., 125 (1969) 108-118.
19. Louie, M. W. and Bell, A. T. J. Am. Chem. Soc., 2013, 135, 12329.
20. Rao, A. H. N.; Nam, S. and Kim, T.-H. International Journal of Hydrogen Energy, 2014, 39, 5919.
21. Lin, B.; Chu, F.; Ren, F.; Jia, B.; Yuan, N.; Shang, H.; Feng, T.; Zhu, Y. and Ding, J. Journal of Power Sources, 2014, 266, 186.
22. Lin, X.; Varcoe, J. R.; Poynton, S. R.; Liang, X.; Ong, A. L.; Ran, J.; Li, Y. and Xu, T. Journal of Material Chemistry A, 2013, 1, 7262.
23. Li, Q.; Liu, L.; Miao, Q.; Jin, B.; Bai, R. Chem. Commun., 2014, 50, 2791-2793.
24. Reddy, M. A. and Fichtner, M. Journal of Materials Chemistry, 2011, 21, 17059
25. Matheson Tri Gas, Lower and Upper Explosive Limits for Flammable Gases and Vapors (LEL/UEL). 2001.
26. Haug, A. T. and White, R. E. Journal of The Electrochemical Society, 2000, 147, 980.
27. J. Hou, Z. Zhang, and L. A. Madsen. Journal of Physical Chemistry B, (2011), 115, 4576-4582.
28. Konstantin Romanenko, Liyu Jin, Luke A. O'Dell, Louis A. Madsen, Jennifer M. Pringle, and Maria Forsyth. Journal of the American Chemical Society (2014) 136, 15638-15645.
29. Giffin, G. A.; Lavina, S.; Pace, G. and Noto, V. D. J. Phys. Chem. C, 2012, 116(45), 23965.
30. Schiller, G.; Henne, R.; Mohr, P.; Peinecke, V. Int. J. Hydrogen Energy, 1998, 23, 761.
31. Wendt, H.; Homann, H.; Plzak, V. Mater. Chem. Phy., 1989, 22, 21.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A composition comprising a polymer having chemical structure:

wherein α is a substituent comprising two or more nitrogen atoms; R1, R2, R3, and R4 are each independently a phenylene oxide, sulfone, imide, ketone, or epichlorohydrin; x and p each is independently an integer having a value ranging from 1 to 1,000; y and q each is independently an integer having a value ranging from 0 to 1,000, or 1 to 1,000; and, m and n each is independently an integer having a value ranging from 1 to 1,000,000.

2. The composition of claim 1, wherein R1 and R2 are identical.

3. The composition of claim 1, wherein R3 and R4 are identical.

4. The composition of claim 3, wherein R1, R2, R3, and R4 are identical.

5. The composition of claim 1, wherein y and/or q is 0.

6. The composition of claim 1, wherein α is a substituent comprising a heterocycle structure comprising two or more nitrogen atoms.

7. The composition of claim 6, wherein the substituent comprises an imidazole.

8. The composition of claim 1, wherein the polymer has the chemical structure:

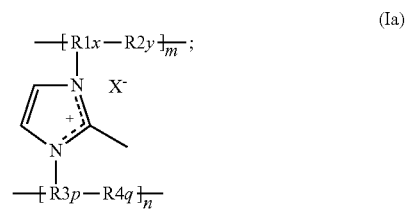

wherein $X^-$ corresponds to any anion.

9. The composition of claim 8, wherein $X^-$ is a hydroxide anion.

10. The composition of claim 1, wherein the polymer has the chemical structure:

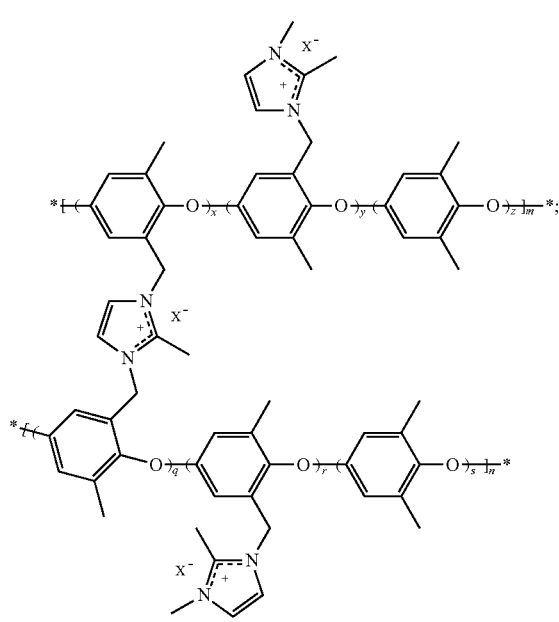

(IV)

wherein q, r, s, x, y, and z each is independently a mole fraction having a value ranging from 0.001 to 0.999; and m and n each is independently an integer having a value ranging from 1 to 1,000,000.

11. The composition of claim 1, wherein the composition comprises a blend of two or more polymers of different chemical structures, wherein each polymer has the chemical structure:

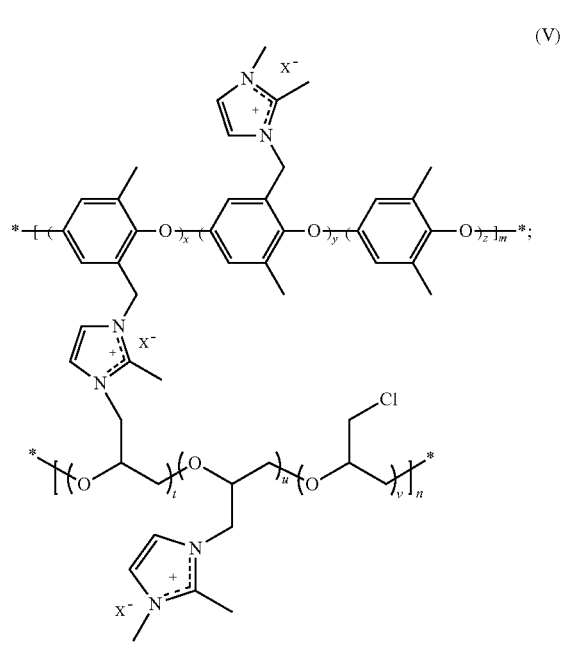

(V)

wherein t, u, v, x, y, and z each is independently a mole fraction having a value ranging from 0.001 to 0.999, and m and n each is independently an integer having a value ranging from 1 to 1,000,000.

12. The composition of claim 1, wherein the polymer has the chemical structure:

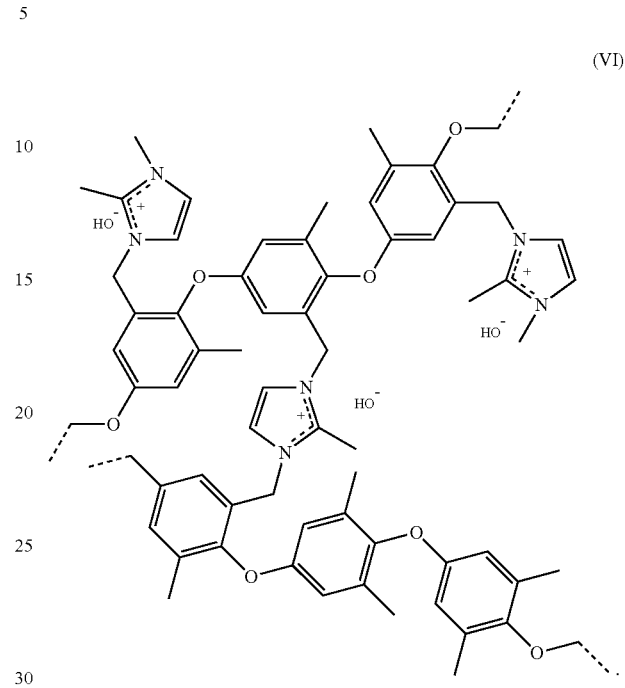

(VI)

13. A method for synthesizing a membrane comprising: (a) reacting a first reactant polymer and a second reactant polymer, optionally (b) converting a precursor polymer into the second reactant polymer, optionally (c) converting the second reactant polymer into the first reactant polymer, wherein steps (b) and (c) occur prior to the reacting step; wherein the first reactant polymer has a chemical structure:

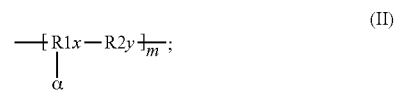

(II)

wherein α is a substituent comprising two or more nitrogen atoms; R1 and R2 are each independently a phenylene oxide, sulfone, imide, ketone, or epichlorohydrin; x is an integer having a value ranging from 1 to 1,000; y is an integer having a value ranging from 0 to 1,000, or 1 to 1,000; and, m is independently an integer having a value ranging from 1 to 1,000,000, and the second reactant polymer has a chemical structure:

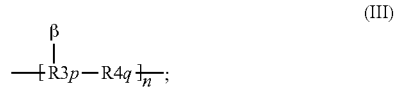

(III)

wherein R3 and R4 are each independently a phenylene oxide, sulfone, imide, ketone, or epichlorohydrin; β is a halogen substituent; p is an integer having a value ranging from 1 to 1,000; q is an integer having a value ranging from 0 to 1,000, or 1 to 1,000; and, n is independently an integer having a value ranging from 1 to 1,000,000.

14. The method of claim 13, wherein the first reactant polymer has the chemical structure:
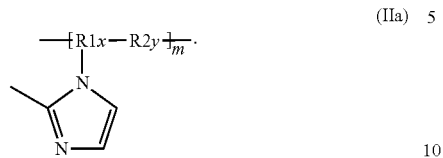
(IIa)
15. The method of claim 13, wherein R3 and R4 are identical.
16. The method of claim 13, wherein q is 0.
17. The method of claim 13, wherein β is —$(CH_2)_a$-Hal, wherein a is an integer from one to ten, and Hal is a halogen.
18. The method of claim 17, wherein a is an integer is one, two, three, or four.
* * * * *